(12) United States Patent
Fukuda et al.

(10) Patent No.: US 12,362,359 B2
(45) Date of Patent: Jul. 15, 2025

(54) POSITIVE ELECTRODE FOR SECONDARY BATTERY, AND SECONDARY BATTERY

(71) Applicant: MURATA MANUFACTURING CO., LTD., Kyoto (JP)

(72) Inventors: Masumi Fukuda, Kyoto (JP); Atsushi Ouki, Kyoto (JP); Atsushi Nemoto, Kyoto (JP); Takamasa Ono, Kyoto (JP); Masaki Kuratsuka, Kyoto (JP); Takashige Fujikawa, Kyoto (JP); Ryuji Soeda, Kyoto (JP); Sho Takahashi, Kyoto (JP); Yoshihito Akiyama, Kyoto (JP); Yosuke Kono, Kyoto (JP); Shoichi Nishiyama, Kyoto (JP); Takeo Asanuma, Kyoto (JP); Shinji Hayazaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 525 days.

(21) Appl. No.: 17/970,312

(22) Filed: Oct. 20, 2022

(65) Prior Publication Data

US 2023/0053792 A1    Feb. 23, 2023

Related U.S. Application Data

(63) Continuation of application No. PCT/JP2021/014723, filed on Apr. 7, 2021.

(30) Foreign Application Priority Data

Apr. 28, 2020 (JP) .................................. 2020-078955
Aug. 4, 2020 (JP) .................................. 2020-132279

(51) Int. Cl.
*H01M 4/525* (2010.01)
*H01M 4/485* (2010.01)
(Continued)

(52) U.S. Cl.
CPC ........... *H01M 4/525* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS

| | | |
|---|---|---|
| 6,730,435 B1 | 5/2004 | Nakane et al. |
| 2014/0087262 A1 | 3/2014 | Imahashi et al. |
| 2020/0235377 A1 | 7/2020 | Tochio et al. |

FOREIGN PATENT DOCUMENTS

| | | |
|---|---|---|
| CN | 109786808 | 5/2019 |
| WO | 2019021806 A1 | 7/2001 |
| WO | 2020059803 A1 | 3/2020 |

OTHER PUBLICATIONS

Chinese Office Action issued Jan. 24, 2025 in corresponding Chinese Application No. 202180025563.4.
(Continued)

*Primary Examiner* — Carlos Barcena
(74) *Attorney, Agent, or Firm* — K&L Gates LLP

(57) ABSTRACT

A secondary battery includes a positive electrode, a negative electrode, and an electrolytic solution. The positive electrode includes a positive electrode active material layer. The positive electrode active material layer includes a lithium-nickel composite oxide of a layered rock-salt type.

8 Claims, 3 Drawing Sheets

(51) Int. Cl.
    H01M 4/505      (2010.01)
    H01M 10/0525    (2010.01)
    H01M 10/0568    (2010.01)
    H01M 4/02       (2006.01)

(52) U.S. Cl.
    CPC ... *H01M 10/0525* (2013.01); *H01M 10/0568* (2013.01); *H01M 2004/021* (2013.01); *H01M 2004/028* (2013.01)

(56) References Cited

OTHER PUBLICATIONS

International Search Report of corresponding PCT application PCT/JP2021/014723, dated Jun. 29, 2021.
Chinese Office Action issued Mar. 3, 2025 in corresponding Chinese Application No. 202180024733.7.
Search Report issued Feb. 26, 2025 in corresponding Chinese Application No. 202180024733.7.
Kang-Joon Park, High-Capacity Concentration Gradient Li[Ni0.865Co0.120Al0.015]O2 Cathode for Lithium-Ion Batteries, Advanced Energy Materials, 2018, 1703612.

POSITIVE ELECTRODE FOR SECONDARY BATTERY, AND SECONDARY BATTERY

CROSS REFERENCE TO RELATED APPLICATIONS

The present application claims priority to PCT patent application no. PCT/JP2021/014723, filed on Apr. 7, 2021, which claims priority to Japanese patent application nos. JP2020-078955 and JP2020-132279, filed on Apr. 28, 2020 and Aug. 4, 2020, respectively, the entire contents of which are incorporated herein by reference.

BACKGROUND

The present technology relates to a positive electrode for a secondary battery, and a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode (a positive electrode for a secondary battery), a negative electrode, and an electrolytic solution. A configuration of the secondary battery has been considered in various ways.

Specifically, in order to obtain a superior characteristic such as superior thermal stability, a layer including $LiAlO_2$ is provided on a surface of a lithium-transition-metal composite oxide particle, and Al derived from $LiAlO_2$ is present in a solid solution state in the vicinity of the surface of the lithium-transition-metal composite oxide particle.

SUMMARY

The present application relates to a positive electrode for a secondary battery, and a secondary battery.

Although consideration has been given in various ways to improve a battery characteristic of a secondary battery, the secondary battery has not yet achieved a sufficient battery characteristic, and there is still room for improvement in terms thereof.

The present technology has been made in view of such an issue, and relates to providing a positive electrode for a secondary battery, and a secondary battery that are each able to achieve a superior battery characteristic according to an embodiment.

A positive electrode for a secondary battery according to an embodiment of the present technology includes a positive electrode active material layer. The positive electrode active material layer includes a lithium-nickel composite oxide of a layered rock-salt type represented by Formula (1) below. According to an analysis of the positive electrode active material layer performed at a surface of the positive electrode active material layer by X-ray photoelectron spectroscopy, a ratio X of an atomic concentration of Al to an atomic concentration of Ni satisfies a condition represented by Expression (2) below. According to an analysis of the positive electrode active material layer performed at an inner part at a depth of 100 nanometers of the positive electrode active material layer by X-ray photoelectron spectroscopy, a ratio Y of the atomic concentration of Al to the atomic concentration of Ni satisfies a condition represented by Expression (3) below. A ratio Z of the ratio X to the ratio Y satisfies a condition represented by Expression (4) below. A B1s spectrum, an S2p spectrum, an F1s spectrum, and an Ni3p spectrum are detectable by a surface analysis of the positive electrode by X-ray photoelectron spectroscopy. A ratio IBN of an intensity of the B1s spectrum to an intensity of the Ni3p spectrum satisfies a condition represented by Expression (5) below. A ratio ISN of an intensity of the S2p spectrum to the intensity of the Ni3p spectrum satisfies a condition represented by Expression (6) below. A ratio IFN of an intensity of the F1s spectrum to the intensity of the Ni3p spectrum satisfies a condition represented by Expression (7) below.

$$Li_aNi_{1-b-c-d}Co_bAl_cM_dO_e \qquad (1)$$

where:
M is at least one of Fe, Mn, Cu, Zn, Cr, V, Ti, Mg, or Zr; and
a, b, c, d, and e satisfy $0.8<a<1.2$, $0.06 \le b \le 0.18$, $0.015 \le c \le 0.05$, $0 \le d \le 0.08$, $0<e<3$, $0.1 \le (b+c+d) \le 0.22$, and $4.33 \le (1-b-c-d)/b \le 15.0$.

$$0.30 \le X \le 0.70 \qquad (2)$$

$$0.16 \le Y \le 0.37 \qquad (3)$$

$$1.30 \le Z \le 2.52 \qquad (4)$$

$$0.9 \le IBN \le 1.8 \qquad (5)$$

$$0.4 \le ISN \le 1.2 \qquad (6)$$

$$8 \le IFN \le 13 \qquad (7)$$

A secondary battery according to an embodiment of the present technology includes a positive electrode, a negative electrode, and an electrolytic solution. The positive electrode has a configuration similar to that of the positive electrode for a secondary battery according to an embodiment of the present technology described above.

Descriptions will be given later as to details of a procedure of analyzing the positive electrode active material layer (a procedure of identifying each of the ratios X, Y, and Z) by X-ray photoelectron spectroscopy and details of a procedure of analyzing the positive electrode (a procedure of identifying each of the ratios IBN, ISN, and IFN) by X-ray photoelectron spectroscopy.

According to the positive electrode for a secondary battery of an embodiment of the present technology, or the secondary battery of an embodiment of the present technology, the positive electrode active material layer includes the lithium-nickel composite oxide of the layered rock-salt type described above, the conditions described above are satisfied regarding an analysis result (the ratios X, Y, and Z) on the positive electrode active material layer obtained by X-ray photoelectron spectroscopy, and the conditions described above are satisfied regarding an analysis result (the ratios IBN, ISN, and IFN) on the positive electrode obtained by X-ray photoelectron spectroscopy. Accordingly, it is possible to obtain a superior battery characteristic.

Note that effects of the present technology are not necessarily limited to those described herein and may include any of a series of suitable effects in relation to the present technology.

DETAILED DESCRIPTION

One or more embodiments of the present technology are described below in further detail including with reference to the drawings.

A description is given first of a secondary battery according to an embodiment of the present technology. A positive electrode for a secondary battery according to an embodiment of the present technology is a portion or a component of the secondary battery, and is thus described together below. Hereinafter, the positive electrode for a secondary battery is simply referred to as a "positive electrode".

The secondary battery to be described herein is a secondary battery that obtains a battery capacity using insertion and extraction of an electrode reactant, and includes a positive electrode, a negative electrode, and an electrolytic solution. The electrolytic solution is a liquid electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

The electrode reactant is not limited to a particular kind, and may specifically be a light metal such as an alkali metal or an alkaline earth metal. Examples of the alkali metal include lithium, sodium, and potassium, and examples of the alkaline earth metal include beryllium, magnesium, and calcium.

In the following, a description is given of an example case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
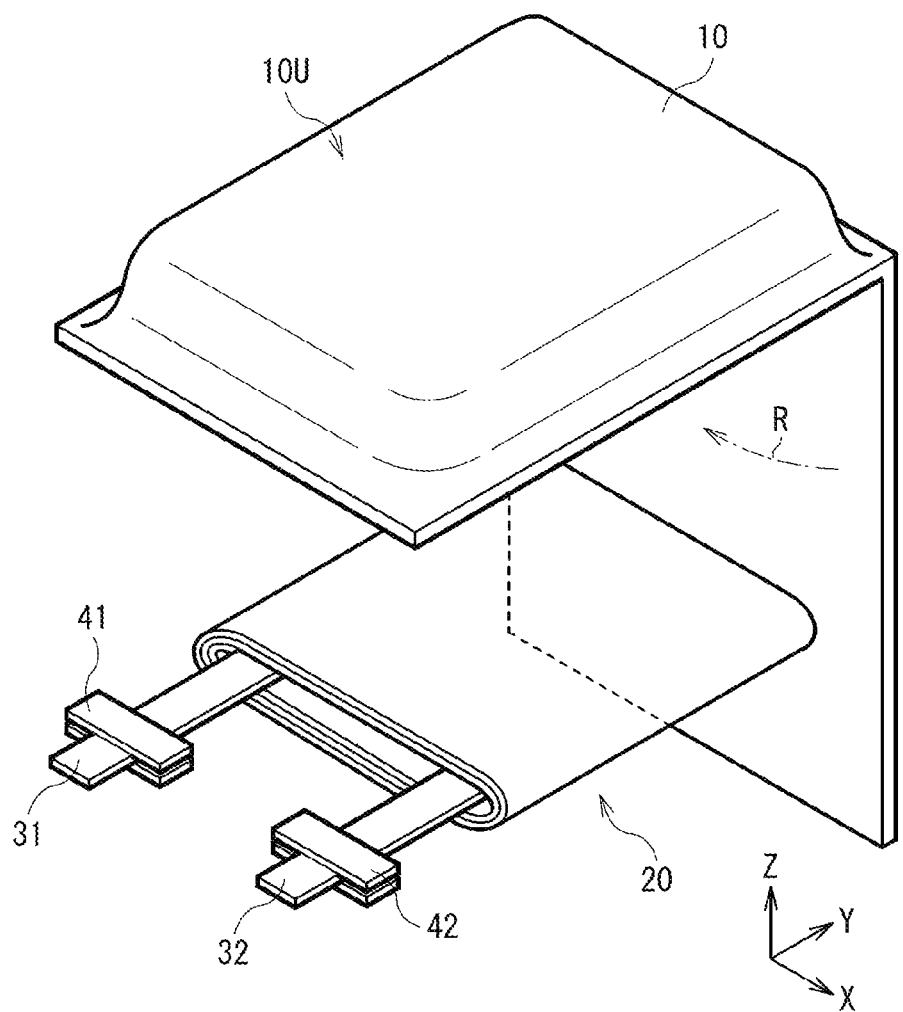
FIG. 1 is a perspective view of a configuration of a secondary battery according to an embodiment of the present technology.
Figure 2:
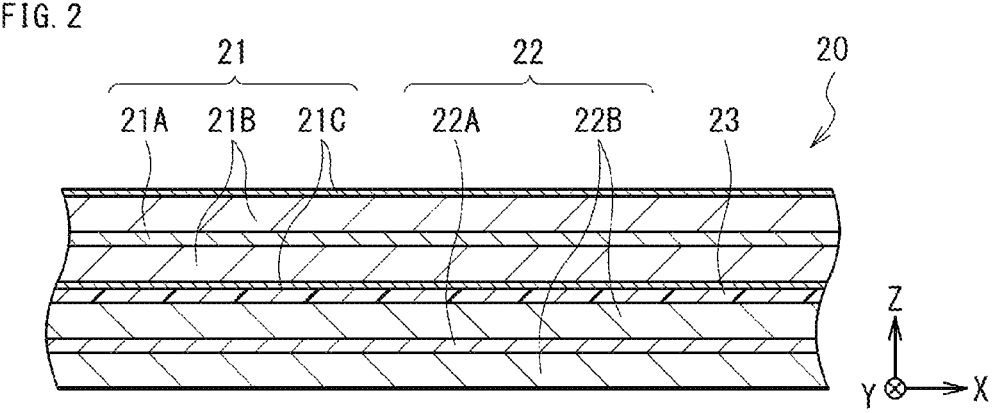
FIG. 2 is a sectional view of a configuration of a battery device illustrated in FIG. 1.

FIG. 1 illustrates a perspective configuration of the secondary battery. FIG. 2 illustrates a sectional configuration of a battery device 20 illustrated in FIG. 1. Note that FIG. 1 illustrates a state in which an outer package film 10 and the battery device 20 are separated away from each other. FIG. 2 illustrates only a portion of the battery device 20.

As illustrated in FIGS. 1 and 2, the secondary battery includes the outer package film 10, the battery device 20, a positive electrode lead 31 and a negative electrode lead 32, and sealing films 41 and 42. The secondary battery described here is a secondary battery of a laminated-film type in which an outer package member having flexibility or softness, that is, the outer package film 10, is used as an outer package member to contain the battery device 20.

As illustrated in FIG. 1, the outer package film 10 is a flexible outer package member to contain the battery device 20, that is, for example, a positive electrode 21, a negative electrode 22, and an electrolytic solution to be described later. The outer package film 10 has a pouch-shaped structure.

Here, the outer package film 10 is a single film member, and is foldable in a folding direction R. The outer package film 10 has a depression part 10U. The depression part 10U is a so-called deep drawn part in which the battery device 20 is to be placed.

The outer package film 10 is not particularly limited in configuration such as the material or the number of layers. The outer package film 10 may thus be a single-layered film or a multilayered film.

Here, the outer package film 10 is a three-layered laminated film including a fusion-bonding layer, a metal layer, and a surface protective layer that are stacked in this order from an inner side. The fusion-bonding layer includes a polymer compound such as polypropylene. The metal layer includes a metal material such as aluminum. The surface protective layer includes a polymer compound such as nylon. In a state where the outer package film 10 is folded, outer edges of the outer package film 10 (the fusion-bonding layer) opposed to each other are fusion-bonded to each other.

As illustrated in FIG. 1, each of the sealing films 41 and 42 is a sealing member for preventing entry of, for example, outside air into the inside of the outer package film 10. The sealing film 41 is interposed between the outer package film 10 and the positive electrode lead 31, and the sealing film 42 is interposed between the outer package film 10 and the negative electrode lead 32. The sealing film 41, the sealing film 42, or both may be omitted, however.

Specifically, the sealing film 41 includes a polymer compound, such as polyolefin, that has adherence to the positive electrode lead 31. Examples of the polyolefin include polypropylene.

The sealing film 42 has a configuration similar to that of the sealing film 41 except that the sealing film 42 has adherence to the negative electrode lead 32. Thus, the sealing film 42 includes a polymer compound, such as polyolefin, that has adherence to the negative electrode lead 32.

As illustrated in FIGS. 1 and 2, the battery device 20 is a power generation device contained inside the outer package film 10, and includes the positive electrode 21, the negative electrode 22, a separator 23, and the electrolytic solution. The electrolytic solution is not illustrated.

Here, the battery device 20 is a so-called wound electrode body. Thus, in the battery device 20, the positive electrode 21 and the negative electrode 22 are stacked on each other with the separator 23 interposed therebetween, and the stack of the positive electrode 21, the negative electrode 22, and the separator 23 is wound about a winding axis. The winding axis is a virtual axis extending in a Y-axis direction. In other words, the positive electrode 21 and the negative electrode 22 are wound while being opposed to each other with the separator 23 interposed therebetween.

The battery device 20 has an elongated three-dimensional shape. A section of the battery device 20 intersecting the winding axis, that is, a section of the battery device 20 along an XZ plane, thus has an elongated shape defined by a major axis and a minor axis. The major axis is a virtual axis that extends in an X-axis direction and has a larger length than the minor axis. The minor axis is a virtual axis that extends in a Z-axis direction intersecting the X-axis direction and has a smaller length than the major axis. Here, the section of the battery device 20 has an elongated, generally elliptical shape.

The positive electrode 21 is the positive electrode for a secondary battery according to an embodiment of the present technology. As illustrated in FIG. 2, the positive electrode 21 includes a positive electrode active material layer 21B. Here, the positive electrode 21 includes a positive electrode current collector 21A and a film 21C together with the positive electrode active material layer 21B. The positive electrode current collector 21A supports the positive electrode active material layer 21B. The film 21C covers a surface of the positive electrode active material layer 21B.

The positive electrode current collector 21A has two opposed surfaces on each of which the positive electrode active material layer 21B is disposed. The positive electrode current collector 21A includes an electrically conductive material such as a metal material. Examples of the metal material include aluminum.

The positive electrode active material layer 21B includes a positive electrode active material into which lithium is insertable and from which lithium is extractable. Here, the positive electrode active material layer 21B is disposed on each of the two opposed surfaces of the positive electrode current collector 21A. Note that the positive electrode active material layer 21B may further include, for example, a positive electrode binder and a positive electrode conductor, and may be disposed only on one of the two opposed surfaces of the positive electrode current collector 21A. A method of forming the positive electrode active material layer 21B is not particularly limited. Specific examples of the method of forming the positive electrode active material layer 21B include a coating method.

Specifically, the positive electrode active material layer 21B includes, as the positive electrode active material, one or more of lithium-nickel composite oxides of a layered rock-salt type represented by Formula (1) below. A reason for this is that a high energy density is obtainable.

$$Li_aNi_{1-b-c-d}Co_bAl_cM_dO_e \quad (1)$$

where:
M is at least one of Fe, Mn, Cu, Zn, Cr, V, Ti, Mg, or Zr; and a, b, c, d, and e satisfy $0.8<a<1.2$, $0.06 \leq b \leq 0.18$, $0.015 \leq c \leq 0.05$, $0 \leq d \leq 0.08$, $0<e<3$, $0.1 \leq (b+c+d) \leq 0.22$, and $4.33 \leq (1-b-c-d)/b \leq 15.0$.

As is apparent from the conditions related to a to e indicated in Formula (1), the lithium-nickel composite oxide is a composite oxide including Li, Ni, Co, and Al as constituent elements, and has a crystal structure of the layered rock-salt type. In other words, the lithium-nickel composite oxide includes two transition metal elements (Ni and Co) as constituent elements.

Note that, as is apparent from a possible value range of d ($0<d<0.08$), the lithium-nickel composite oxide may further include an additional element M as a constituent element. The additional element M is not particularly limited in kind, as long as the additional element M includes one or more of Fe, Mn, Cu, Zn, Cr, V, Ti, Mg, or Zr described above.

In particular, as is apparent from a possible value range of (b+c+d), that is, $(0.1 \leq (b+c+d) \leq 0.22)$, a possible value range of (1−b−c−d) is the following range: $0.78 \leq (1-b-c-d) \leq 0.9$. Accordingly, the lithium-nickel composite oxide includes, as a main component, Ni out of the two transition metal elements (Ni and Co). A reason for this is that a high energy density is obtainable.

Further, in the lithium-nickel composite oxide including the two transition metal elements (Ni and Co) as constituent elements, as is apparent from a possible value range of (1−b−c−d)/b, that is, $(4.33 \leq (1-b-c-d)/b \leq 15.0)$, a molar ratio (1−b−c−d) of Ni is sufficiently large relative to a molar ratio (b) of Co. In other words, a ratio of the molar ratio of Ni to the molar ratio of Co (an NC ratio=(1−b−c−d)/b) is sufficiently large within an appropriate range. A reason for this is that the discharge capacity is prevented from easily decreasing even upon repeated charging and discharging, while the energy density is secured. Note that the value of the NC ratio is rounded off to two decimal places.

Here, a molar ratio (d) of the additional element M satisfies $d \geq 0$; thus, the lithium-nickel composite oxide may include the additional element M as a constituent element, or may include no additional element M as a constituent element. In particular, d preferably satisfies $d>0$, and the lithium-nickel composite oxide thus preferably includes the additional element M as a constituent element. A reason for this is that it becomes easier for lithium ions to smoothly enter and exit the positive electrode active material (the lithium-nickel composite oxide) at the time of charging and discharging.

A specific composition of the lithium-nickel composite oxide is not particularly limited as long as the conditions indicated in Formula (1) are satisfied. The specific composition of the lithium-nickel composite oxide will be described in detail later in Examples.

The positive electrode active material may further include one or more of lithium compounds together with the lithium-nickel composite oxide described above. Note that the lithium-nickel composite oxide described above is excluded from the lithium compound to be described here.

The term "lithium compound" is a generic term for a compound that includes lithium as a constituent element, and more specifically, a compound that includes lithium and one or more transition metal elements as constituent elements. The lithium compound is not particularly limited in kind, and is specifically, for example, an oxide, a phosphoric acid compound, a silicic acid compound, or a boric acid compound. Specific examples of the oxide include $LiNiO_2$, $LiCoO_2$, and $LiMn_2O_4$. Specific examples of the phosphoric acid compound include $LiFePO_4$ and $LiMnPO_4$.

The positive electrode binder includes one or more of materials including, without limitation, a synthetic rubber and a polymer compound. Examples of the synthetic rubber include a styrene-butadiene-based rubber. Examples of the polymer compound include polyvinylidene difluoride. The positive electrode conductor includes one or more of electrically conductive materials including, without limitation, a carbon material. Examples of the carbon material include graphite, carbon black, acetylene black, and Ketjen black. The electrically conductive material may be, for example, a metal material or a polymer compound.

Here, regarding a physical property of the positive electrode 21 (the positive electrode active material layer 21B) including the positive electrode active material (the lithium-nickel composite oxide), predetermined physical property conditions are satisfied in order to improve a battery characteristic of the secondary battery. Details of the physical property conditions of the positive electrode 21 (the positive electrode active material layer 21B) will be described later.

The film 21C is a film formed on the surface of the positive electrode active material layer 21B through charging and discharging of the secondary battery. More specifically, the film 21C is a deposit film deposited on the surface of the positive electrode active material layer 21B due to, for example, a decomposition reaction of the electrolytic solution occurring upon charging and discharging.

The film 21C is formed on the surface of the positive electrode active material layer 21B mainly as a result of charging and discharging in a stabilization process on the secondary battery to be described later, that is, initial-cycle charging and discharging after the secondary battery is assembled. Note that the film 21C may be additionally formed on the surface of the positive electrode active material layer 21B as a result of charging and discharging performed after the stabilization process on the secondary battery, that is, charging and discharging performed after the secondary battery is completed.

The film 21C may cover the entire surface of the positive electrode active material layer 21B, or may cover only a portion of the surface of the positive electrode active material layer 21B. Needless to say, in the latter case, multiple films 21C may cover the surface of the positive electrode active material layer 21B at respective locations separate from each other.

Here, the positive electrode active material layer 21B is disposed on each of the two opposed surfaces of the positive electrode current collector 21A. The positive electrode 21 thus includes two positive electrode active material layers 21B. Further, the film 21C is provided to cover the surface of each of the two positive electrode active material layers 21B. The positive electrode 21 thus includes two films 21C. Note that the film 21C may be provided to cover the surface of only one of the two positive electrode active material layers 21B, and the positive electrode 21 may thus include one film 21C.

By a surface analysis of the positive electrode 21 (the film 21C) by X-ray photoelectron spectroscopy (XPS), predetermined XPS spectra, that is, a B1s spectrum, an S2p spectrum, an F1s spectrum, and an Ni3p spectrum, are detectable. In other words, the film 21C may include B, S, and F as constituent elements, while the positive electrode active material layer 21B includes the lithium-nickel composite oxide described above and thus includes Ni as a constituent element.

More specifically, as will be described later, in a case where the electrolytic solution includes a boron-containing compound, a sulfur-containing compound, and a fluorine-containing compound, the film 21C is formed due to the decomposition reaction of such an electrolytic solution. The film 21C thus includes B, S, and F as constituent elements, as described above.

Here, in order to improve the battery characteristic of the secondary battery, the predetermined physical property conditions are satisfied regarding the physical property of the positive electrode 21 (the film 21C). Details of the physical property of the positive electrode 21 (the film 21C) will be described later.

As illustrated in FIG. 2, the negative electrode 22 includes a negative electrode current collector 22A and a negative electrode active material layer 22B.

The negative electrode current collector 22A has two opposed surfaces on each of which the negative electrode active material layer 22B is disposed. The negative electrode current collector 22A includes an electrically conductive material such as a metal material. Examples of the metal material include copper.

The negative electrode active material layer 22B includes one or more of negative electrode active materials into which lithium is insertable and from which lithium is extractable. Here, the negative electrode active material layer 22B is disposed on each of the two opposed surfaces of the negative electrode current collector 22A. Note that the negative electrode active material layer 22B may further include, for example, a negative electrode binder and a negative electrode conductor, and may be disposed only on one of the two opposed surfaces of the negative electrode current collector 22A. Respective details of the negative electrode binder and the negative electrode conductor are similar to the respective details of the positive electrode binder and the positive electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

Examples of the negative electrode active material include a carbon material and a metal-based material. A reason for this is that a high energy density is obtainable. Examples of the carbon material include graphitizable carbon, non-graphitizable carbon, and graphite (natural graphite and artificial graphite). The term "metal-based material" is a generic term for a material that includes, as a constituent element or constituent elements, one or more elements among metal elements and metalloid elements that are each able to form an alloy with lithium. Examples of the metal elements and metalloid elements include silicon and tin. The metal-based material may be a simple substance, an alloy, a compound, a mixture of two or more thereof, or a material including two or more phases thereof. Specific examples of the metal-based material include $TiSi_2$ and $SiO_x$ ($0<x\leq2$, or $0.2<x<1.4$).

The separator 23 is an insulating porous film interposed between the positive electrode 21 and the negative electrode 22, as illustrated in FIG. 2. The separator 23 allows lithium ions to pass therethrough while preventing contact (a short circuit) between the positive electrode 21 and the negative electrode 22. The separator 23 includes a polymer compound such as polyethylene.

The electrolytic solution includes a solvent and an electrolyte salt. The positive electrode 21, the negative electrode 22, and the separator 23 are each impregnated with the electrolytic solution.

The solvent includes one or more of non-aqueous solvents (organic solvents) including, without limitation, a carbonic-acid-ester-based compound, a carboxylic-acid-ester-based compound, and a lactone-based compound. An electrolytic solution including a non-aqueous solvent is a so-called non-aqueous electrolytic solution. The electrolyte salt includes one or more of light metal salts including, without limitation, a lithium salt.

Note that as described above, the electrolytic solution may further include the boron-containing compound, the sulfur-containing compound, and the fluorine-containing compound in order for three XPS spectra (the B1s spectrum, the S2p spectrum, and the F1s spectrum) to be detectable by the surface analysis of the positive electrode 21 by XPS.

The term "boron-containing compound" is a generic term for a compound that includes B as a constituent element. The boron-containing compound is not particularly limited in kind, and specifically includes one or more of compounds including, without limitation, a boron-containing lithium salt.

Specific examples of the boron-containing lithium salt include lithium tetrafluoroborate, lithium difluoro(oxalato) borate, and lithium bis(oxalato)borate.

The term "sulfur-containing compound" is a generic term for a compound that includes S as a constituent element. The sulfur-containing compound is not particularly limited in kind, and specifically includes one or more of compounds including, without limitation, a cyclic disulfonic acid anhydride and an alkynyl sulfonic acid. In other words, the sulfur-containing compound may include only the cyclic disulfonic acid anhydride, only the alkynyl sulfonic acid, or both the cyclic disulfonic acid anhydride and the alkynyl sulfonic acid.

The cyclic disulfonic acid anhydride is a cyclic compound resulting from dehydration of a disulfonic acid anhydride. Specific examples of the cyclic disulfonic acid anhydride include 1,2-ethanedisulfonic anhydride and 1,3-propanedisulfonic anhydride. Further examples of the cyclic disulfonic acid anhydride may include 1,2-benzenedisulfonic anhydride.

The alkynyl sulfonic acid is a sulfonic acid including a carbon-carbon triple bond. Specific examples of the alkynyl sulfonic acid include propargyl benzenesulfonate and propargyl methanesulfonate.

The term "fluorine-containing compound" is a generic term for a compound that includes F as a constituent element. The fluorine-containing compound is not particularly limited in kind, and specifically includes one or more of compounds including, without limitation, a fluorine-containing lithium salt.

Specific examples of the fluorine-containing lithium salt include lithium hexafluorophosphate, lithium trifluoromethanesulfonate, lithium bis(fluorosulfonyl)imide, lithium bis(trifluoromethanesulfonyl)imide, and lithium tris(trifluoromethanesulfonyl)methide. Further examples of the fluorine-containing lithium salt may include lithium hexafluoroarsenate ($LiAsF_6$).

Note that a compound including both B and F as constituent elements shall fall under the category of the boron-containing compound, rather than the fluorine-containing compound. Accordingly, as described above, a lithium salt including both boron and fluorine as constituent elements, i.e., lithium tetrafluoroborate, is the boron-containing compound (the boron-containing lithium salt), not the fluorine-containing compound (the fluorine-containing lithium salt).

A content of the boron-containing compound in the electrolytic solution is not particularly limited, and may be freely chosen. The same applies to a content of the sulfur-containing compound in the electrolytic solution, and to a content of the fluorine-containing compound in the electrolytic solution.

Note that, for purpose of understanding, the electrolytic solution does not necessarily have to include the boron-containing compound, the sulfur-containing compound, and the fluorine-containing compound, as long as the four XPS spectra (the B1s spectrum, the S2p spectrum, the F1s spectrum, and the Ni3p spectrum) to be described later are detectable by the surface analysis of the positive electrode 21 by XPS and three intensity ratios (intensity ratios IBN, ISN, and IFN) to be described later satisfy predetermined conditions. In this case, the electrolytic solution does not have to include all of the boron-containing compound, the sulfur-containing compound, and the fluorine-containing compound, and may thus include only any one or two of the boron-containing compound, the sulfur-containing compound, or the fluorine-containing compound.

Specifically, even if the electrolytic solution includes all of the boron-containing compound, the sulfur-containing compound, and the fluorine-containing compound initially (at the time of preparation of the electrolytic solution), these compounds may all be consumed in forming the film 21C upon charging and discharging in the stabilization process on the secondary battery. In such a case, the electrolytic solution in the completed secondary battery may include none of the boron-containing compound, the sulfur-containing compound, and the fluorine-containing compound.

Further, even if the electrolytic solution initially includes all of the boron-containing compound, the sulfur-containing compound, and the fluorine-containing compound, any one or two of these compounds may be consumed in forming the film 21C upon charging and discharging in the stabilization process on the secondary battery. In such a case, the electrolytic solution in the completed secondary battery may include only the remaining one or two of the boron-containing compound, the sulfur-containing compound, or the fluorine-containing compound.

As illustrated in FIG. 1, the positive electrode lead 31 is a positive electrode terminal coupled to the battery device 20 (the positive electrode 21), and is led out from inside to outside the outer package film 10. The positive electrode lead 31 includes an electrically conductive material such as aluminum. The positive electrode lead 31 has a thin plate shape or a meshed shape, for example.

As illustrated in FIG. 1, the negative electrode lead 32 is a negative electrode terminal coupled to the battery device 20 (the negative electrode 22), and is led out from inside to outside the outer package film 10 in a direction similar to that in the case with the positive electrode 21. The negative electrode lead 32 includes an electrically conductive material such as copper. Details of a shape of the negative electrode lead 32 are similar to the details of the shape of the positive electrode lead 31.

As described above, in a case where the secondary battery includes the positive electrode active material (the lithium-nickel composite oxide), predetermined physical property conditions are satisfied regarding the physical property of the positive electrode 21 (the positive electrode active material layer 21B), and predetermined physical property conditions are satisfied regarding the physical property of the positive electrode 21 (the film 21C), in order to achieve an improved battery characteristic.

Specifically, all of three conditions (physical property conditions 1 to 3) described below are satisfied regarding an analysis result on the positive electrode active material layer 21B obtained by XPS, that is, regarding the physical property of the positive electrode active material layer 21B.

Here, prior to describing the physical property conditions 1 to 3 individually, a description will be given of a premise for describing the physical property conditions 1 to 3.

Figure 3:
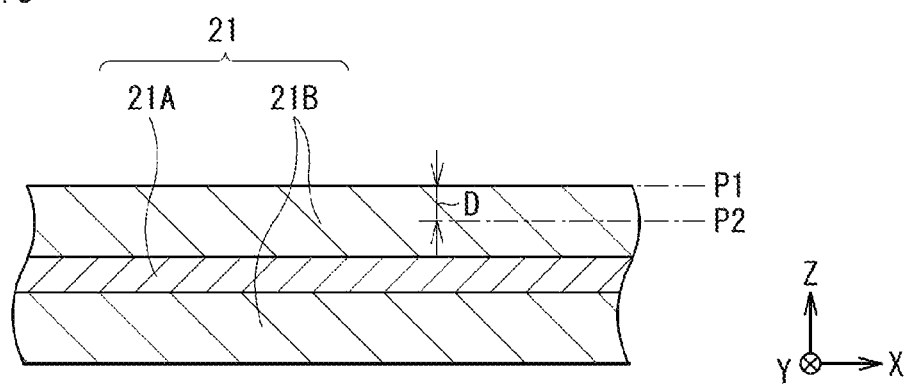
FIG. 3 is an enlarged sectional view of a configuration of a positive electrode illustrated in FIG. 2.

FIG. 3 illustrates an enlarged sectional configuration of the positive electrode 21 illustrated in FIG. 2. Positions P1 and P2 illustrated in FIG. 3 indicate two analysis positions where the positive electrode active material layer 21B is to be analyzed by XPS. The position P1 is a position of the surface of the positive electrode active material layer 21B, where the positive electrode active material layer 21B is viewed from the surface in a depth direction (the Z-axis direction). The position P2 is a position of an inner part of the positive electrode active material layer 21B, where the positive electrode active material layer 21B is viewed from the surface in the same direction. More specifically, the position P2 is a position at a depth D of 100 nm (depth D=100 nm) from the surface of the positive electrode active material layer 21B.

As described above, the positive electrode active material layer 21B includes the lithium-nickel composite oxide of the layered rock-salt type as the positive electrode active material, and the lithium-nickel composite oxide includes Ni and Al as constituent elements.

In this case, if the positive electrode active material layer 21B is analyzed by XPS, two XPS spectra, i.e., an Ni2p3/2 spectrum and an Al2s spectrum, are detected as the analysis result. The Ni2p3/2 spectrum is an XPS spectrum derived from Ni atoms in the lithium-nickel composite oxide, and the Al2s spectrum is an XPS spectrum derived from Al atoms in the lithium-nickel composite oxide.

Thus, an atomic concentration (at %) of Ni is calculated on the basis of a spectrum intensity of the Ni2p3/2 spectrum, and an atomic concentration (at %) of Al is calculated on the basis of a spectrum intensity of the Al2s spectrum.

(Physical Property Condition 1)

According to an analysis of the positive electrode active material layer 21B performed at the surface (the position P1) of the positive electrode active material layer 21B by XPS, a concentration ratio X (=atomic concentration of Al/atomic concentration of Ni) which is a ratio of the atomic concentration of Al to the atomic concentration of Ni satisfies a condition represented by Expression (2) below.

$$0.30 \leq X \leq 0.70 \quad (2)$$

The concentration ratio X is a parameter indicating a magnitude relationship between an abundance of Ni atoms and an abundance of Al atoms at the position P1. At the surface (the position P1) of the positive electrode active material layer 21B, as is apparent from the condition indicated in Expression (2), the abundance of Al atoms is appropriately smaller than the abundance of Ni atoms.

(Physical Property Condition 2)

According to an analysis of the positive electrode active material layer 21B performed at the inner part (the position P2) of the positive electrode active material layer 21B by XPS, a concentration ratio Y (=atomic concentration of Al/atomic concentration of Ni) which is a ratio of the atomic concentration of Al to the atomic concentration of Ni satisfies a condition represented by Expression (3) below.

$$0.16 \leq Y \leq 0.37 \quad (3)$$

The concentration ratio Y is a parameter indicating a magnitude relationship between the abundance of Ni atoms and the abundance of Al atoms at the position P2. At the inner part (the position P2) of the positive electrode active material layer 21B, as is apparent from the condition indicated in Expression (3), the abundance of Al atoms is appropriately smaller than the abundance of Ni atoms. Note that, as is apparent from comparison between the physical property conditions 1 and 2, the abundance of Al atoms is appropriately larger at the surface (the position P1) than at the inner part (the position P2). To put it the other way around, the abundance of Al atoms is appropriately smaller at the inner part (the position P2) than at the surface (the position P1).

(Physical Property Condition 3)

Regarding the concentration ratios X and Y described above, a relative ratio Z (=concentration ratio X/concentration ratio Y) which is a ratio of the concentration ratio X to the concentration ratio Y satisfies a condition represented by Expression (4) below.

$$1.30 \leq Z \leq 2.52 \quad (4)$$

The relative ratio Z is a parameter indicating a magnitude relationship between the abundance of Al atoms at the position P1 and the abundance of Al atoms at the position P2. As is apparent from the condition indicated in Expression (4), the abundance of Al atoms gradually decreases from the surface (the position P1) toward the inner part (the position P2) in the positive electrode active material layer 21B, resulting in an appropriate concentration gradient regarding the abundance (atomic concentration) of Al atoms.

All of the physical property conditions 1 to 3 are satisfied for a reason below. This suppresses a decrease in discharge capacity and gas generation even upon repeated charging and discharging, and improves a lithium-ion entering and exiting characteristic not only at an initial cycle of charging and discharging but also at subsequent cycles of charging and discharging, while allowing for a high energy density. Details of the reason why all of the physical property conditions 1 to 3 are satisfied will be described later.

A procedure of analyzing the positive electrode active material layer 21B by XPS, that is, a procedure of identifying each of the concentration ratios X and Y and the relative ratio Z, is as described below.

First, the secondary battery is discharged, and thereafter the secondary battery is disassembled to thereby collect the positive electrode 21 (the positive electrode active material layer 21B). Thereafter, the positive electrode 21 is washed with pure water, following which the positive electrode 21 is dried. Thereafter, the positive electrode 21 is cut into a rectangular shape (10 mm×10 mm) to thereby obtain a sample for analysis.

Thereafter, the sample is analyzed by means of an XPS analyzer. In this case, PHI Quantera SXM, a scanning X-ray photoelectron spectrometer manufactured by ULVAC-PHI, Inc., is used as the XPS analyzer. Analysis conditions are as follows. Light source: monochromatic Al Kα beam (1486.6 eV); degree of vacuum: $1\times10^{-9}$ Torr (=approx. $133.3\times10^{-9}$ Pa); analysis range (diameter): 100 μm; analysis depth: several nanometers; and use of an electron flood gun: yes.

As a result, the Ni2p3/2 spectrum and the Al2s spectrum are each detected at the surface (the position P1) of the positive electrode active material layer 21B, and the atomic concentration (at %) of Ni and the atomic concentration (at %) of Al are each calculated. Thus, the concentration ratio X is calculated on the basis of the atomic concentration of Ni and the atomic concentration of Al.

Thereafter, the operation of calculating the concentration ratio X described above is repeated twenty times, following which an average value of the twenty concentration ratios X is calculated as a final concentration ratio X, i.e., a concentration ratio X to be used to determine whether the physical property condition 1 is satisfied. A reason for using the average value as the value of the concentration ratio X is that this improves calculation accuracy (reproducibility) of the concentration ratio X.

Thereafter, performed is an analysis procedure that is similar to the analysis procedure employed in calculating the concentration ratio X, except that the analysis depth among the analysis conditions is changed from several nanometers to 100 nm, and that the following additional analysis conditions are introduced: acceleration voltage: 1 kV; and sputtering rate: within a range from 6 nm to 7 nm both inclusive in terms of $SiO_2$. In this manner, the atomic concentration (at %) of Ni and the atomic concentration (at %) of Al at the inner part (the position P2) of the positive electrode active material layer 21B are each calculated. The concentration ratio Y is thus calculated on the basis of the atomic concentration of Ni and the atomic concentration of Al. In this case also, an average value is used as a final concentration ratio Y. This improves calculation accuracy (reproducibility) of the concentration ratio Y.

Lastly, the relative ratio Z is calculated on the basis of the concentration ratios X and Y. In this manner, the concentration ratios X and Y are each identified and the relative ratio Z is identified.

In addition, to further prevent the decrease in discharge capacity and the gas generation from being easily caused even upon repeated charging and discharging, all of the following three physical property conditions (physical property conditions 4 to 6) are satisfied regarding an analysis result on the positive electrode 21 obtained by XPS, that is, regarding the physical property of the positive electrode 21.

Here, as illustrated in FIG. 2, the positive electrode 21 includes the film 21C. Thus, the surface analysis of the positive electrode 21 by XPS includes an analysis of the film 21C. As a result, the predetermined physical property conditions are satisfied regarding the physical property of the positive electrode 21 (the film 21C).

Specifically, as described above, the positive electrode active material layer 21B includes the lithium-nickel composite oxide of the layered rock-salt type as the positive electrode active material, and the lithium-nickel composite oxide includes Ni as a constituent element. Further, as described above, the film 21C covers the surface of the positive electrode active material layer 21B, and includes B, S, and F as constituent elements.

In this case, if a surface analysis is performed on the positive electrode 21 (the film 21C) by XPS, the four XPS spectra, i.e., the B1s spectrum, the S2p spectrum, the F1s spectrum, and the Ni3p spectrum, are detected as the analysis result. The B1s spectrum is an XPS spectrum derived from B atoms in the electrolytic solution (the boron-containing compound). The S2p spectrum is an XPS spectrum derived from S atoms in the electrolytic solution (the sulfur-containing compound). The F1s spectrum is an XPS spectrum derived from F atoms in the electrolytic solution (the fluorine-containing compound). The Ni3p spectrum is an XPS spectrum derived from Ni atoms in the positive electrode active material layer 21B (the lithium-nickel composite oxide).

The three intensity ratios (the intensity ratios IBN, ISN, and IFN) are calculated on the basis of the analysis result on the positive electrode 21 (the film 21C) obtained by XPS. The three intensity ratios satisfy conditions described below.

(Physical Property Condition 4)

The intensity ratio IBN is a ratio of an intensity IB of the B1s spectrum to an intensity IN of the Ni3p spectrum, i.e., IB/IN. The intensity ratio IBN satisfies a condition represented by Expression (5) below.

$$0.9 \leq IBN \leq 1.8 \quad (5)$$

(Physical Property Condition 5)

The intensity ratio ISN is a ratio of an intensity IS of the S2p spectrum to the intensity IN of the Ni3p spectrum, i.e., IS/IN. The intensity ratio ISN satisfies a condition represented by Expression (6) below.

$$0.4 \leq ISN \leq 1.2 \quad (6)$$

(Physical Property Condition 6)

The intensity ratio IFN is a ratio of an intensity IF of the F1s spectrum to the intensity IN of the Ni3p spectrum, i.e., IF/IN. The intensity ratio IFN satisfies a condition represented by Expression (7) below.

$$8 \leq IFN \leq 13 \quad (7)$$

The intensity ratios IBN, ISN, and IFN satisfy the respective conditions described above. A reason for this is that this allows for optimization of a bonding state (an oxidation state) of constituent atoms, including O atoms and Ni atoms, in the crystal structure of the positive electrode active material (the lithium-nickel composite oxide) in the positive electrode 21 including the positive electrode active material. Thus, the crystal structure of the positive electrode active material is stabilized, and the surface of the positive electrode 21 is brought into an electrochemically stable state through the use of the film 21C. This suppresses a decomposition reaction of the electrolytic solution on the surface of the positive electrode 21 upon charging and discharging, and accordingly suppresses the gas generation to be caused by the decomposition reaction of the electrolytic solution. As a result, swelling of the secondary battery upon charging and discharging is suppressed even if the positive electrode 21 includes the lithium-nickel composite oxide.

A procedure of analyzing the positive electrode 21 (the film 21C) by XPS is similar to the above-described procedure of analyzing the positive electrode active material layer 21B by XPS, except that the film 21C is subjected to a surface analysis to detect the four XPS spectra (the B1s spectrum, the S2p spectrum, the F1s spectrum, and the Ni3p spectrum) and thereafter the three intensity ratios (the intensity ratios IBN, ISN, and IFN) are calculated.

Note that in a case where the electrolytic solution includes the boron-containing compound, the intensity IB of the B1s spectrum varies depending on the content of the boron-containing compound in the electrolytic solution. Likewise, in a case where the electrolytic solution includes the sulfur-containing compound, the intensity IS of the S2p spectrum varies depending on the content of the sulfur-containing compound in the electrolytic solution, and the intensity IF of the F1s spectrum varies depending on the content of the fluorine-containing compound in the electrolytic solution.

Accordingly, the intensity ratio IBN is controllable by adjusting the content of the boron-containing compound in the electrolytic solution. Likewise, the intensity ratio ISN is controllable by adjusting the content of the sulfur-containing compound in the electrolytic solution, and the intensity ratio IFN is controllable by adjusting the content of the fluorine-containing compound in the electrolytic solution.

Upon charging the secondary battery, in the battery device 20, lithium is extracted from the positive electrode 21 and the extracted lithium is inserted into the negative electrode 22 via the electrolytic solution. Upon discharging the secondary battery, in the battery device 20, lithium is extracted from the negative electrode 22 and the extracted lithium is inserted into the positive electrode 21 via the electrolytic solution. Upon the charging and discharging, lithium is inserted and extracted in an ionic state.

The positive electrode active material (the lithium-nickel composite oxide) is manufactured, following which the secondary battery is fabricated using the positive electrode active material.

In accordance with a procedure described below, the positive electrode active material (the lithium-nickel composite oxide) is manufactured by coprecipitation and firing including a single firing process.

First, as raw materials, a Ni source (a nickel compound) and a Co source (a cobalt compound) are prepared.

The nickel compound includes one or more of compounds that each include Ni as a constituent element. Specifically, the nickel compound is, for example, an oxide, a carbonic acid salt, a sulfuric acid salt, or a hydroxide. Details of the cobalt compound are similar to the details of the nickel compound except that the cobalt compound includes Co, instead of Ni, as a constituent element.

Thereafter, a mixture of the nickel compound and the cobalt compound is put into an aqueous solvent to thereby prepare a mixture aqueous solution. The aqueous solvent is not particularly limited in kind, and specific examples thereof include pure water. The details of the kind of the aqueous solvent described here apply also to the description below. A mixture ratio between the nickel compound and the cobalt compound, that is, a molar ratio between Ni and Co, may be set to any value depending on the composition of the positive electrode active material (the lithium-nickel composite oxide) to be finally manufactured.

Thereafter, one or more of alkali compounds are added to the mixture aqueous solution. The alkali compound is not particularly limited in kind, and is specifically, for example, a hydroxide. A precipitate in a form of particles is thereby generated, i.e., coprecipitation is performed. Thus, a precursor (secondary particles of a nickel-cobalt composite coprecipitated hydroxide) for synthesizing the lithium-nickel composite oxide is obtained. In this case, as will be described in detail later in Examples, secondary particles of a bi-model design including two kinds of particles, i.e., large-sized particles and small-sized particles, may be used. Thereafter, the precursor is washed with an aqueous solvent.

Thereafter, as other raw materials, a Li source (a lithium compound) and an Al source (an aluminum compound) are prepared. In this case, a source of the additional element M (an additional compound) may further be prepared.

The lithium compound includes one or more of compounds that each include Li as a constituent element. Specifically, the lithium compound is, for example, an oxide, a carbonic acid salt, a sulfuric acid salt, or a hydroxide. Details of the aluminum compound are similar to the details of the lithium compound except that the aluminum compound includes Al, instead of Li, as a constituent element. Details of the additional compound are similar to the details of the lithium compound except that the additional compound includes the additional element M, instead of Li, as a constituent element.

Thereafter, the precursor, the lithium compound, and the aluminum compound are mixed with each other to thereby obtain a precursor mixture. In this case, the additional compound may further be mixed with, for example, the precursor to thereby obtain a precursor mixture including the additional compound. A mixture ratio between the precursor, the lithium compound, and the aluminum compound (a molar ratio between Ni, Co, Li, and Al) may be set to any values depending on the composition of the positive electrode active material (the lithium-nickel composite oxide) to be finally manufactured. The same applies to a mixture ratio of the additional compound (a molar ratio of the additional element M).

Lastly, the precursor mixture is fired in an oxygen atmosphere, i.e., firing is performed. Conditions including, without limitation, a firing temperature and a firing time, may be freely chosen. The precursor, the lithium compound, and the aluminum compound thus react with each other. In this manner, the lithium-nickel composite oxide including Li, Ni, Co, and Al as constituent elements is synthesized. The positive electrode active material (the lithium-nickel composite oxide) is thereby obtained. As a matter of course, in a case where the precursor mixture includes the additional compound, the positive electrode active material (the lithium-nickel composite oxide) that further includes the additional element M as a constituent element is obtained.

In this case, in the process of firing the precursor mixture, Al atoms in the aluminum compound are sufficiently diffused toward an inner part of the precursor. This results in the concentration gradient in which the abundance (atomic concentration) of Al atoms gradually decreases from the surface (the position P1) toward the inner part (the position P2).

In the case of manufacturing the positive electrode active material (the lithium-nickel composite oxide), it is possible to adjust each of the concentration ratios X and Y by changing a condition such as the firing temperature in firing the precursor mixture. Accordingly, it is also possible to adjust the relative ratio Z.

In accordance with the following procedure, the secondary battery is manufactured using the positive electrode active material (the lithium-nickel composite oxide) described above. In the following, a description is given of a case where the positive electrode 21 including the film 21C is fabricated and where the electrolytic solution including the boron-containing compound, the sulfur-containing compound, and the fluorine-containing compound is prepared.

First, the positive electrode active material and other materials including, without limitation, the positive electrode binder and the positive electrode conductor, are mixed with each other to thereby obtain a positive electrode mixture, following which the positive electrode mixture is put into a solvent such as an organic solvent to thereby prepare a paste positive electrode mixture slurry. Thereafter, the positive electrode mixture slurry is applied on each of the two opposed surfaces of the positive electrode current collector 21A to thereby form the positive electrode active material layer 21B. Lastly, as will be described later, the secondary battery is assembled using the electrolytic solution including the boron-containing compound, the sulfur-containing compound, and the fluorine-containing compound, following which the secondary battery is subjected to a stabilization process (a charging and discharging process). The film 21C including B, S, and F as constituent elements is thereby formed on the surface of the positive electrode active material layer 21B. Thereafter, the positive electrode active material layer 21B may be compression-molded by means of, for example, a roll pressing machine. In this case, the positive electrode active material layer 21B may be heated. The positive electrode active material layer 21B may be compression-molded multiple times. In this manner, the positive electrode active material layer 21B and the film 21C are formed on each of the two opposed surfaces of the positive electrode current collector 21A. Thus, the positive electrode 21 is fabricated.

The negative electrode 22 is fabricated in accordance with a procedure similar to the fabrication procedure for the positive electrode 21 described above. Specifically, the negative electrode active material and other materials including, without limitation, the negative electrode binder and the negative electrode conductor, are mixed with each other to thereby obtain a negative electrode mixture, following which the negative electrode mixture is put into a solvent such as an organic solvent to thereby prepare a paste negative electrode mixture slurry. Thereafter, the negative electrode mixture slurry is applied on each of the two opposed surfaces of the negative electrode current collector 22A to thereby form the negative electrode active material layer 22B. Needless to say, the negative electrode active material layer 22B may be compression-molded. In this manner, the negative electrode active material layer 22B is formed on each of the two opposed surfaces of the negative electrode current collector 22A. Thus, the negative electrode 22 is fabricated.

The electrolyte salt is put into the solvent, following which the boron-containing compound, the sulfur-containing compound, and the fluorine-containing compound are added to the solvent. The electrolyte salt is thereby dispersed or dissolved in the solvent. Thus, the electrolytic solution is prepared.

First, the positive electrode lead 31 is coupled to the positive electrode 21 (the positive electrode current collector 21A) by a method such as a welding method, and the negative electrode lead 32 is coupled to the negative electrode 22 (the negative electrode current collector 22A) by a method such as a welding method.

Thereafter, the positive electrode 21 and the negative electrode 22 are stacked on each other with the separator 23 interposed therebetween, following which the stack of the positive electrode 21, the negative electrode 22, and the separator 23 is wound to thereby fabricate a wound body. The wound body has a configuration similar to the configuration of the battery device 20 except that the positive electrode 21, the negative electrode 22, and the separator 23 are each unimpregnated with the electrolytic solution. Thereafter, the wound body is pressed with a machine such as a pressing machine to thereby shape the wound body into an elongated shape.

Thereafter, the wound body is placed inside the depression part 10U, following which the outer package film 10 is folded to thereby cause portions of the outer package film 10 to be opposed to each other. Thereafter, outer edges of two sides of the outer package film 10 (the fusion-bonding layer) opposed to each other are fusion-bonded to each other by a method such as a thermal-fusion-bonding method. The wound body is thereby contained inside the outer package film 10 shaped like a pouch.

Lastly, the electrolytic solution is injected into the pouch-shaped outer package film 10, following which the outer edges of the remaining one side of the outer package film 10 (the fusion-bonding layer) are fusion-bonded to each other by a method such as a thermal-fusion-bonding method. In this case, the sealing film 41 is interposed between the outer package film 10 and the positive electrode lead 31, and the sealing film 42 is interposed between the outer package film 10 and the negative electrode lead 32. The wound body is thereby impregnated with the electrolytic solution. In this manner, the battery device 20, i.e., the wound electrode body, is fabricated, and the battery device 20 is sealed in the pouch-shaped outer package film 10. Thus, the secondary battery is assembled.

The secondary battery after being assembled is charged and discharged. Various conditions including, without limitation, an environment temperature, the number of times of charging and discharging (the number of cycles), and charging and discharging conditions may be freely chosen. A film is thus formed on a surface of, for example, the negative electrode 22. This electrochemically stabilizes the state of the secondary battery.

In this case, because the electrolytic solution includes the boron-containing compound, the sulfur-containing compound, and the fluorine-containing compound, the film 21C is formed on the surface of the positive electrode active material layer 21B through the stabilization process (the charging and discharging process) on the secondary battery.

Thus, the secondary battery including the outer package film 10, that is, the secondary battery of the laminated-film type, is completed.

According to the secondary battery, the positive electrode active material layer 21B of the positive electrode 21 includes the lithium-nickel composite oxide of the layered rock-salt type as the positive electrode active material. All of the physical property conditions 1 to 3 are satisfied regarding the analysis result (the concentration ratios X and Y and the relative ratio Z) on the positive electrode active material layer 21B obtained by XPS. All of the physical property conditions 4 to 6 are satisfied regarding the analysis result (the intensity ratios IBN, ISN, and IFN) on the positive electrode 21 obtained by XPS.

In this case, a series of actions described below is achieved on the basis of the composition of the positive electrode active material (the lithium-nickel composite oxide) and the physical property conditions 1 to 6.

Firstly, the positive electrode active material (the lithium-nickel composite oxide) includes Ni, which is a transition metal element, as a main component. This makes it possible to obtain a high energy density.

Secondly, Al included as a constituent element in the lithium-nickel composite oxide is present as a pillar not contributing to an oxidation-reduction reaction in the layered rock-salt crystal structure (a transition metal layer). Thus, Al has a property of not being involved in charging and discharging reactions while being able to suppress a change in crystal structure.

Here, because the physical property condition 1 is satisfied, an appropriate and sufficient amount of Al atoms is present at the surface (the position P1) of the positive electrode active material layer 21B. In this case, upon charging and discharging (upon insertion and extraction of lithium ions), the crystal structure of the lithium-nickel composite oxide is prevented from easily changing in the vicinity of the surface of the positive electrode active material layer 21B, which prevents the positive electrode active material layer 21B from easily swelling and contracting. Note that examples of a change in the crystal structure of the lithium-nickel composite oxide include an unintentional Li extraction phenomenon. This prevents the positive electrode active material from easily cracking upon charging and discharging, which prevents a highly reactive fresh surface from easily appearing on the positive electrode active material. The electrolytic solution is thus prevented from being easily decomposed on the fresh surface of the positive electrode active material. As a result, the discharge capacity is prevented from easily decreasing even upon repeated charging and discharging, and gas generation to be caused by the decomposition reaction of the electrolytic solution is suppressed upon charging and discharging.

In this case, even if the secondary battery is used (charged and discharged, or stored) in a high-temperature environment, in particular, the discharge capacity is sufficiently prevented from easily decreasing, and gas is sufficiently prevented from being easily generated. In addition, in the positive electrode active material, a resistive film is prevented from being easily formed as a result of the fresh surface being prevented from easily appearing, and a change in crystal structure (e.g., a structural change from a hexagonal crystal to a cubic crystal) which causes an increase in resistance is also prevented from easily occurring.

Thirdly, because the physical property condition 2 is satisfied, the abundance of Al atoms is appropriately and sufficiently smaller at the inner part (the position P2) of the positive electrode active material layer 21B than at the surface (the position P1). In this case, not only at the initial cycle of charging and discharging but also at the subsequent cycles of charging and discharging, lithium ions are able to enter and exit the positive electrode active material layer 21B more easily, without being excessively influenced by Al atoms, at an inner portion of the positive electrode active material layer 21B than in the vicinity of the surface thereof. This makes it easier for the charging and discharging reactions to proceed smoothly and sufficiently. As a result, the energy density is secured, and it becomes easier for lithium ions to be stably and sufficiently inserted and extracted upon charging and discharging.

Fourthly, because the physical property condition 3 is satisfied, in the positive electrode active material layer 21B, the abundance of Al atoms is appropriately smaller at the inner part (the position P2) than at the surface (the position P1). More specifically, the abundance of Al decreases gradually, not abruptly, from the surface (the position P1) toward the inner part (the position P2). In this case, in the positive electrode active material layer 21B, an advantage related to a first action based on the physical property condition 1 described above and an advantage related to a second action based on the physical property condition 2 described above are achieved in balance. This prevents a trade-off relationship in which achieving one of the advantages results in failing to achieve the other, in contrast to a case where the physical property condition 3 is not satisfied. Accordingly, both of the two advantages are effectively achievable.

Fifthly, because the physical property conditions 4 to 6 are satisfied, the state of the positive electrode 21 is stabilized. Specifically, in the positive electrode 21 including the positive electrode active material (the lithium-nickel composite oxide), the bonding state (the oxidation state) of the constituent atoms, including Ni atoms, in the crystal structure of the positive electrode active material is optimized, which stabilizes the crystal structure of the positive electrode active material, and electrochemically stabilizes the surface state of the positive electrode active material layer 21B. Moreover, for example, the bonding state of the constituent atoms in the positive electrode 21, including B atoms, S atoms, and F atoms, is optimized, which better stabilizes the surface state of the positive electrode 21 electrochemically. As a result, even if the positive electrode 21 includes the lithium-nickel composite oxide, a decomposition reaction of the electrolytic solution at the surface of the positive electrode 21 is prevented from easily occurring upon charging and discharging. This suppresses gas generation to be caused by the decomposition reaction of the electrolytic solution.

By virtue of the foregoing, unlike in a case where not all of the physical property conditions 1 to 6 are satisfied, the decrease in discharge capacity and the gas generation are suppressed even upon repeated charging and discharging, and the lithium-ion entering and exiting characteristic improves not only at the initial cycle of charging and discharging but also at the subsequent cycles of charging and discharging, while a high energy density is obtained. This makes it possible to achieve a superior battery characteristic.

In this case, in particular, using coprecipitation and firing including a single firing process as the method of manufacturing the positive electrode active material allows substantially all of the physical property conditions 1 to 3 to be satisfied, which makes it possible to achieve an improved battery characteristic, unlike in a case of using coprecipitation and firing including two firing processes.

Specifically, as will be described in detail later in Examples, in the case of using coprecipitation and firing including two firing processes, the abundance of Al atoms in the positive electrode active material layer 21B becomes smaller at the inner part (the position P2) than at the surface (the position P1), as in the case of using coprecipitation and firing including a single firing process. However, the abundance of Al atoms excessively increases at the surface (the position P1) and excessively decreases at the inner part (the position P2), which results in a failure to satisfy the physical property condition 1 and a failure to satisfy the physical property condition 2. Otherwise, the abundance of Al atoms abruptly decreases at the inner part (the position P2) relative to that at the surface (the position P1), which results in a failure to satisfy the physical property condition 3. Accordingly, not all of the physical property conditions 1 to 3 are not satisfied. This results in the trade-off relationship described above, thus making it difficult to achieve an improved battery characteristic.

In contrast, in the case of using coprecipitation and firing including a single firing process, the abundance of Al atoms in the positive electrode active material layer 21B appropriately increases at the surface (the position P1) and appropriately decreases at the inner part (the position P2), unlike in the case of using coprecipitation and firing including two firing processes. This allows both the physical property conditions 1 and 2 to be satisfied. Moreover, the abundance of Al atoms gradually decreases from the surface (the position P1) toward the inner part (the position P2), which allows the physical property condition 3 to be satisfied. All of the physical property conditions 1 to 3 are thus satisfied. This overcomes the trade-off relationship described above, making it possible to achieve an improved battery characteristic.

In addition, d in Formula (1) may satisfy d>0, and the lithium-nickel composite oxide may thus include the additional element M as a constituent element. This makes it easier for lithium ions to smoothly enter and exit the positive electrode active material (the lithium-nickel composite oxide) at the time of charging and discharging. Accordingly, it is possible to achieve higher effects.

Further, the secondary battery may include the outer package film 10 having flexibility. Also in a case where the flexible outer package film 10 is used which causes deformation (swelling) to be visually recognized easily, the swelling of the secondary battery is effectively suppressed. Accordingly, it is possible to achieve higher effects.

Further, the positive electrode 21 may include the film 21C (which includes B, S, and F as constituent elements), and the surface analysis of the positive electrode 21 by XPS may include an analysis of the film 21C. This makes it easier to electrochemically stabilize the surface state of the positive electrode 21 through the use of the film 21C. Accordingly, it is possible to achieve higher effects.

Further, the electrolytic solution may include the boron-containing compound, the sulfur-containing compound, and the fluorine-containing compound. This makes it easier to detect the three XPS spectra (the B1 s spectrum, the S2p spectrum, and the F1s spectrum), and makes it easier to satisfy the above-described conditions regarding the three intensity ratios (the intensity ratios IBN, ISN, and IFN). Accordingly, it is possible to achieve higher effects.

In this case, the boron-containing compound may include a boron-containing lithium salt, the sulfur-containing compound may include a cyclic disulfonic acid anhydride, an alkynyl sulfonic acid, or both, and the fluorine-containing compound may include a fluorine-containing lithium salt. This makes it easier to stably detect the three XPS spectra, and makes it further easier to satisfy the above-described conditions regarding the three intensity ratios. Accordingly, it is possible to achieve further higher effects.

Further, the secondary battery may include a lithium-ion secondary battery. This makes it possible to obtain a sufficient battery capacity stably through the use of insertion and extraction of lithium. Accordingly, it is possible to achieve higher effects.

In addition, according to the positive electrode 21, the positive electrode active material layer 21B includes the lithium-nickel composite oxide of the layered rock-salt type as the positive electrode active material, all of the physical property conditions 1 to 3 are satisfied regarding the analysis result (the concentration ratios X and Y and the relative ratio Z) on the positive electrode active material layer 21B obtained by XPS, and all of the physical property conditions 4 to 6 are satisfied regarding the analysis result (the intensity ratios IBN, ISN, and IFN) on the positive electrode 21 obtained by XPS. Accordingly, for the reasons described above, it is possible for the secondary battery including the positive electrode 21 to achieve a superior battery characteristic.

Next, a description is given of modifications of the above-described secondary battery according to an embodiment. The configuration of the secondary battery is appropriately modifiable as described below. Note that any two or more of the following series of modifications may be combined with each other.

The separator 23 which is a porous film is used. However, although not specifically illustrated here, a separator of a stacked type including a polymer compound layer may be used instead of the separator 23 which is the porous film.

Specifically, the separator of the stacked type includes a porous film having two opposed surfaces, and the polymer compound layer disposed on one of or each of the two opposed surfaces of the porous film. A reason for this is that adherence of the separator to each of the positive electrode 21 and the negative electrode 22 improves to suppress the occurrence of misalignment of the battery device 20 (irregular winding of each of the positive electrode 21, the negative electrode 22, and the separator). This helps to prevent the secondary battery from easily swelling even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that such insulating particles dissipate heat upon heat generation by the secondary battery, thus improving safety or heat resistance of the secondary battery. Examples of the insulating particles include inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator of the stacked type, a precursor solution including, without limitation, the polymer compound and an organic solvent, is prepared and thereafter the precursor solution is applied on one of or each of the two opposed surfaces of the porous film. In this case, the insulating particles may be added to the precursor solution on an as-needed basis.

Also in the case where the separator of the stacked type is used, lithium ions are movable between the positive electrode 21 and the negative electrode 22. Accordingly, it is possible to achieve similar effects.

The electrolytic solution which is a liquid electrolyte is used. However, although not specifically illustrated here, an electrolyte layer which is a gel electrolyte may be used instead of the electrolytic solution.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. A reason for this is that liquid leakage is prevented. The configuration of the electrolytic solution is as described above. The polymer compound includes, for example, polyvinylidene difluoride. In a case of forming the electrolyte layer, a precursor solution including, without limitation, the electrolytic solution, the polymer compound, and an organic solvent is prepared and thereafter the precursor solution is applied on one side or both sides of the positive electrode 21 and one side or both sides of the negative electrode 22.

Also in the case where the electrolyte layer is used, lithium ions are movable between the positive electrode 21 and the negative electrode 22 via the electrolyte layer. Accordingly, it is possible to achieve similar effects.

Next, a description is given of applications (application examples) of the above-described secondary battery according to an embodiment.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. In these applications, one secondary battery or a plurality of secondary batteries may be used.

In particular, the battery pack is effectively applied to relatively large-sized equipment, etc., including an electric vehicle, an electric power storage system, and an electric power tool. The battery pack may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

One of application examples of the secondary battery will now be described in detail. The configuration of the application example described below is merely an example, and is appropriately modifiable.

Figure 4:
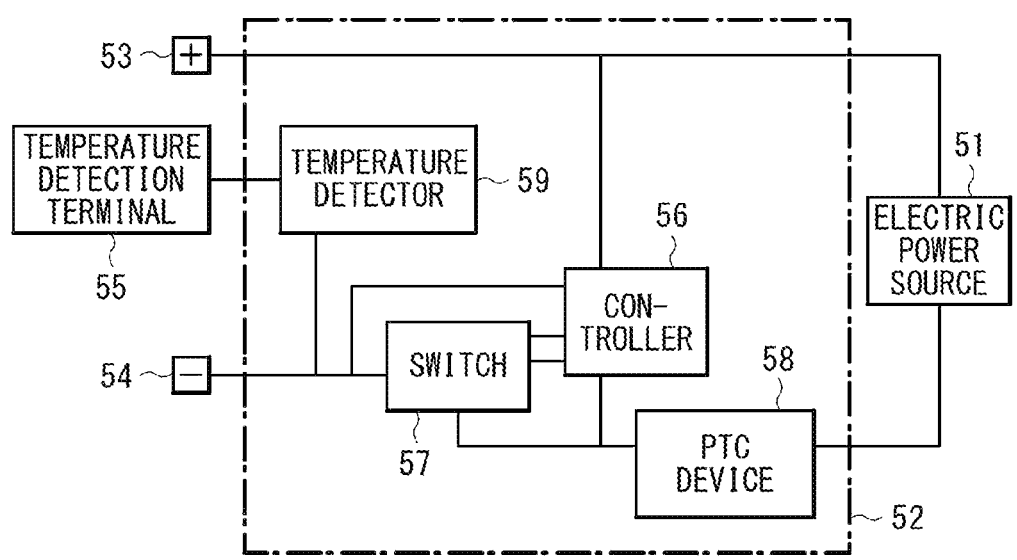
FIG. 4 is a block diagram illustrating a configuration of an application example of the secondary battery.

FIG. 4 illustrates a block configuration of a battery pack. The battery pack described here is a simple battery pack (a so-called soft pack) including one secondary battery, and is to be mounted on, for example, electronic equipment typified by a smartphone.

As illustrated in FIG. 4, the battery pack includes an electric power source 51 and a circuit board 52. The circuit board 52 is coupled to the electric power source 51, and includes a positive electrode terminal 53, a negative electrode terminal 54, and a temperature detection terminal 55 (a so-called T terminal).

The electric power source 51 includes one secondary battery. The secondary battery has a positive electrode lead coupled to the positive electrode terminal 53 and a negative electrode lead coupled to the negative electrode terminal 54. The electric power source 51 is couplable to outside via the positive electrode terminal 53 and the negative electrode terminal 54, and is thus chargeable and dischargeable via the positive electrode terminal 53 and the negative electrode terminal 54. The circuit board 52 includes a controller 56, a switch 57, a thermosensitive resistive device (a positive temperature coefficient (PTC) device) 58, and a temperature detector 59. However, the PTC device 58 may be omitted.

The controller 56 includes, for example, a central processing unit (CPU) and a memory, and controls an overall operation of the battery pack. The controller 56 detects and controls a use state of the electric power source 51 on an as-needed basis.

If a voltage of the electric power source 51 (the secondary battery) reaches an overcharge detection voltage or an overdischarge detection voltage, the controller 56 turns off the switch 57. This prevents a charging current from flowing into a current path of the electric power source 51. In addition, if a large current flows upon charging or discharging, the controller 56 turns off the switch 57 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected on the basis of an ON-resistance of the switch 57.

The temperature detector 59 includes a temperature detection device such as a thermistor. The temperature detector 59 measures a temperature of the electric power source 51 using the temperature detection terminal 55, and outputs a result of the temperature measurement to the controller 56. The result of the temperature measurement to be obtained by the temperature detector 59 is used, for example, in a case where the controller 56 performs charge/discharge control upon abnormal heat generation or in a case where the controller 56 performs a correction process upon calculating a remaining capacity.

EXAMPLES

A description is given of Examples of the present technology according to an embodiment.

Examples 1 to 8 and Comparative Examples 9 to 15

As described below, positive electrode active materials were manufactured, and secondary batteries were manufactured using the positive electrode active materials, following which the secondary batteries were each evaluated for a battery characteristic.

Manufacture of Positive Electrode Active Materials in Examples 1 to 8 and Comparative Examples 9 to 14

The positive electrode active material (the lithium-nickel composite oxide) was manufactured by, as the manufacturing method, coprecipitation and firing including a single firing process, in accordance with a procedure described below.

First, as raw materials, a nickel compound (nickel sulfate ($NiSO_4$)) in a powder form and a cobalt compound (cobalt sulfate ($CoSO_4$)) in a powder form were prepared. Thereafter, the nickel compound and the cobalt compound were mixed with each other to thereby obtain a mixture. In this case, the mixture ratio between the nickel compound and the cobalt compound was adjusted to set the mixture ratio (molar ratio) between Ni and Co to 85.4:14.6. The mixture ratio between the nickel compound and the cobalt compound was varied by varying the mixture ratio (molar ratio) of Co depending on the mixture ratio (molar ratio) of Ni.

Thereafter, the mixture was put into an aqueous solvent (pure water), following which the aqueous solvent was stirred to thereby obtain a mixture aqueous solution.

Thereafter, while stirring the mixture aqueous solution, alkali compounds (sodium hydroxide (NaOH) and ammonium hydroxide ($NH_4OH$)) were added to the mixture aqueous solution, i.e., coprecipitation was performed. A precipitate in a form of particles was thereby generated in the mixture aqueous solution. Thus, a precursor (secondary particles of a nickel-cobalt composite coprecipitated hydroxide) was obtained. The composition of the precursor was as listed in Table 1. In this case, an average particle size of the secondary particles was controlled in order to finally obtain secondary particles of the positive electrode active material having two different average particle sizes (median diameters D50 (μm)), that is, secondary particles of the positive electrode active material of the bi-model design including large-sized particles and small-sized particles. Two kinds of secondary particles having respective different average particle sizes were thereby formed.

Thereafter, as other raw materials, a lithium compound (lithium hydroxide monohydrate ($LiOH \cdot H_2O$)) in a powder form and an aluminum compound (aluminum hydroxide ($Al(OH)_3$)) in a powder form were prepared.

Thereafter, the precursor, the aluminum compound, and the lithium compound were mixed with each other to thereby obtain a precursor mixture. In this case, a mixture ratio between the precursor and the aluminum compound was adjusted to set a mixture ratio (molar ratio) between Ni, Co, and Al to 82.0:14.0:4.0, and an addition amount (wt %) of the aluminum compound to the precursor was set to 1.12 wt %. In addition, a mixture ratio of the precursor and the aluminum compound to the lithium compound was adjusted to set a mixture ratio (molar ratio) of Ni, Co, and Al to Li to 103:100. Note that the mixture ratio between the precursor and the aluminum compound was varied by varying the mixture ratio (molar ratio) of Ni and Co depending on the mixture ratio (molar ratio) of Al. In addition, the mixture ratio of the precursor and the aluminum compound to the lithium compound was varied by varying the mixture ratio (molar ratio) of Ni, Co, and Al depending on the mixture ratio (molar ratio) of Li.

The "Addition timing" column in Table 1 indicates timing when the aluminum compound was added in the course of manufacturing the positive electrode active material. "After coprecipitation" indicates that the aluminum compound was added to the precursor after the precursor was obtained by coprecipitation, before performing a firing process to be described later.

Lastly, the precursor mixture was fired in an oxygen atmosphere. The firing temperature (° C.) was as listed in Table 1. Thus, the lithium-nickel composite oxide of the layered rock-salt type represented by Formula (1) in a powder form was synthesized.

The "Number of times of firing" column in Table 1 indicates the number of firing processes performed in the course of manufacturing the positive electrode active material. Here, the firing process was performed after the precursor was formed by coprecipitation. The number of times of firing was thus once.

In this manner, the positive electrode active material (the lithium-nickel composite oxide) was obtained. The composition and the NC ratio of the lithium-nickel composite oxide were as listed in Table 2.

In the case of manufacturing the positive electrode active material, the lithium-nickel composite oxide including, as a constituent element, manganese which is the additional element M was also synthesized in accordance with a similar procedure except that a manganese compound (manganese sulfate ($MnSO_4$)) in a powder form was further prepared as still another raw material, following which the manganese compound was further mixed with the precursor to thereby obtain the precursor mixture.

The "Additional element M" column in Table 2 indicates the presence or absence of the additional element M, and indicates, in a case where the lithium-nickel composite oxide included the additional element M as a constituent element, the kind of the additional element M.

Manufacture of Positive Electrode Active Material in Comparative Example 15

For comparison, the positive electrode active material (the lithium-nickel composite oxide) was manufactured by, as the manufacturing method, coprecipitation and firing including two firing processes, instead of coprecipitation and firing including a single firing process, in accordance with a procedure described below.

In this case, first, the precursor (the secondary particles of the nickel-cobalt composite coprecipitated hydroxide) was obtained by coprecipitation in accordance with the procedure described above. Thereafter, a mixture of the precursor and the lithium compound (lithium hydroxide monohydrate) in a powder form was obtained, following which the mixture was fired (a first firing process). The mixture ratio (molar ratio) between the precursor and the lithium compound was as described above, and the firing temperature (° C.) in the first firing process was as listed in Table 1. Thus, a composite oxide in a powder form was obtained as a fired body.

Thereafter, a mixture of the composite oxide and the aluminum compound (aluminum hydroxide) in a powder form was obtained, following which the mixture was fired (a second firing process) in an oxygen atmosphere. In this case, an addition amount of the aluminum compound to the composite oxide was set to 0.41 wt %. The firing temperature (° C.) in the second firing process was as listed in Table 1. In this manner, a lithium-nickel composite oxide (a lithium nickel cobalt oxide with a surface covered with Al) of the layered rock-salt type in a powder form was synthesized. Thus, the positive electrode active material was obtained. The composition and the NC ratio of the positive electrode active material were as listed in Table 2.

Here, the aluminum compound was added after the first firing process was performed, before performing the second firing process. The addition timing of the aluminum compound was thus after the first firing, as indicated in the "Addition timing" column in Table 1. Here, two firing processes were performed as the method of manufacturing the positive electrode active material, and the number of times of firing was thus twice, as indicated in the "Number of times of firing" column in Table 1.

TABLE 1

|  | Manufacturing method | Precursor Composition | Aluminum compound | | Firing process | |
|---|---|---|---|---|---|---|
|  |  |  | Addition timing | Addition amount (wt %) | Number of times of firing | Firing temperature (° C.) |
| Example 1 | Coprecipitation + firing | $(Ni_{0.854}Co_{0.146})(OH)_2$ | After coprecipitation | 1.12 | 1 | 700 |
| Example 2 |  | $(Ni_{0.854}Co_{0.146})(OH)_2$ |  | 1.41 |  | 700 |
| Example 3 |  | $(Ni_{0.854}Co_{0.146})(OH)_2$ |  | 0.41 |  | 700 |
| Example 4 |  | $(Ni_{0.854}Co_{0.146})(OH)_2$ |  | 1.12 |  | 650 |
| Example 5 |  | $(Ni_{0.854}Co_{0.146})(OH)_2$ |  | 1.12 |  | 850 |
| Example 6 |  | $(Ni_{0.812}Co_{0.188})(OH)_2$ |  | 1.12 |  | 700 |
| Example 7 |  | $(Ni_{0.937}Co_{0.063})(OH)_2$ |  | 1.12 |  | 700 |
| Example 8 |  | $(Ni_{0.833}Co_{0.083}Mn_{0.083})(OH)_2$ |  | 1.12 |  | 700 |
| Comparative example 9 | Coprecipitation + firing | $(Ni_{0.854}Co_{0.146})(OH)_2$ | After coprecipitation | 1.56 | 1 | 700 |
| Comparative example 10 |  | $(Ni_{0.854}Co_{0.146})(OH)_2$ |  | 0.27 |  | 700 |
| Comparative example 11 |  | $(Ni_{0.854}Co_{0.146})(OH)_2$ |  | 1.12 |  | 600 |
| Comparative example 12 |  | $(Ni_{0.854}Co_{0.146})(OH)_2$ |  | 1.12 |  | 900 |
| Comparative example 13 |  | $(Ni_{0.781}Co_{0.219})(OH)_2$ |  | 1.12 |  | 700 |

TABLE 1-continued

| | | | Aluminum compound | | Firing process | |
|---|---|---|---|---|---|---|
| | Manufacturing method | Precursor Composition | Addition timing | Addition amount (wt %) | Number of times of firing | Firing temperature (° C.) |
| Comparative example 14 | | $(Ni_{0.969}Co_{0.031})(OH)_2$ | | 1.12 | | 700 |
| Comparative example 15 | | $(Ni_{0.854}Co_{0.146})(OH)_2$ | After first firing | 0.41 | 2 | First: 700 Second: 650 |

TABLE 2

Intensity ratio IBN = 1.2; Intensity ratio ISN = 0.9; Intensity ratio IFN = 9

| | Lithium-nickel composite oxide | | | Positive electrode active material layer | | | Initial capacity (—) | Cycle retention rate (%) | Load retention rate (%) | Swelling rate (%) |
|---|---|---|---|---|---|---|---|---|---|---|
| | Composition | NC ratio | Additional element M | Concentration ratio X | Concentration ratio Y | Relative ratio Z | | | | |
| Example 1 | $LiNi_{0.820}Co_{0.140}Al_{0.040}O_2$ | 5.86 | — | 0.51 | 0.27 | 1.90 | 100 | 90 | 78 | 9 |
| Example 2 | $LiNi_{0.811}Co_{0.139}Al_{0.050}O_2$ | 5.83 | — | 0.70 | 0.37 | 1.87 | 99 | 94 | 75 | 8.1 |
| Example 3 | $LiNi_{0.841}Co_{0.144}Al_{0.015}O_2$ | 5.84 | — | 0.30 | 0.16 | 1.91 | 102 | 85 | 80 | 9.9 |
| Example 4 | $LiNi_{0.820}Co_{0.140}Al_{0.040}O_2$ | 5.86 | — | 0.57 | 0.23 | 2.52 | 97 | 92 | 79 | 9.09 |
| Example 5 | $LiNi_{0.820}Co_{0.140}Al_{0.040}O_2$ | 5.86 | — | 0.43 | 0.33 | 1.30 | 100 | 88 | 75 | 9 |
| Example 6 | $LiNi_{0.780}Co_{0.180}Al_{0.040}O_2$ | 4.33 | — | 0.52 | 0.28 | 1.89 | 96 | 92 | 77 | 9 |
| Example 7 | $LiNi_{0.900}Co_{0.060}Al_{0.040}O_2$ | 15.0 | — | 0.50 | 0.27 | 1.88 | 106 | 85 | 79 | 9 |
| Example 8 | $LiNi_{0.800}Co_{0.080}Al_{0.040}Mn_{0.080}O_2$ | 10.0 | Mn | 0.51 | 0.27 | 1.89 | 102 | 90 | 76 | 9 |
| Comparative example 9 | $LiNi_{0.807}Co_{0.138}Al_{0.055}O_2$ | 5.85 | — | 0.73 | 0.39 | 1.85 | 103 | 83 | 81 | 10.17 |
| Comparative example 10 | $LiNi_{0.846}Co_{0.144}Al_{0.010}O_2$ | 5.88 | — | 0.28 | 0.14 | 1.94 | 95 | 88 | 75 | 9.18 |
| Comparative example 11 | $LiNi_{0.820}Co_{0.140}Al_{0.040}O_2$ | 5.86 | — | 0.60 | 0.17 | 3.55 | 100 | 85 | 74 | 9 |
| Comparative example 12 | $LiNi_{0.820}Co_{0.140}Al_{0.040}O_2$ | 5.86 | — | 0.40 | 0.32 | 1.25 | 95 | 93 | 78 | 9 |
| Comparative example 13 | $LiNi_{0.750}Co_{0.210}Al_{0.040}O_2$ | 3.57 | — | 0.53 | 0.28 | 1.89 | 108 | 81 | 79 | 9 |
| Comparative example 14 | $LiNi_{0.930}Co_{0.030}Al_{0.040}O_2$ | 31.0 | — | 0.49 | 0.26 | 1.91 | 102 | 84 | 73 | 9.45 |
| Comparative example 15 | $LiNi_{0.841}Co_{0.144}Al_{0.015}O_2$ | 5.84 | — | 0.60 | 0.15 | 4.00 | 103 | 83 | 81 | 10.17 |

Manufacture of Secondary Batteries in Examples 1 to 8 and Comparative Examples 9 to 15

The secondary batteries (lithium-ion secondary batteries) of the laminated-film type illustrated in FIGS. 1 to 3 were manufactured in accordance with a procedure described below.

(Fabrication of Positive Electrode)

First, 95.5 parts by mass of the positive electrode active material (the lithium-nickel composite oxide), 1.9 parts by mass of the positive electrode binder (polyvinylidene difluoride), 2.5 parts by mass of the positive electrode conductor (carbon black), and 0.1 parts by mass of a dispersant (polyvinylpyrrolidone) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on each of the two opposed surfaces of the positive electrode current collector 21A (a band-shaped aluminum foil having a thickness of 15 pin) by means of a coating apparatus, following which the applied positive electrode mixture slurry was dried to thereby form the positive electrode active material layer 21B. Thereafter, the positive electrode active material layer 21B was compression-molded by means of a roll pressing machine.

Lastly, as described later, the secondary battery was assembled using the electrolytic solution including the boron-containing compound, the sulfur-containing compound, and the fluorine-containing compound, following which the secondary battery was subjected to the stabilization process (the charging and discharging process) to thereby form the film 21C on the surface of the positive electrode active material layer 21B. Thus, the positive electrode 21 was fabricated.

The result obtained by analyzing the physical property (the concentration ratios X and Y and the relative ratio Z) of the positive electrode 21 (the positive electrode active material layer 21B) by XPS after the fabrication of the positive electrode 21 was as presented in Table 2. The procedure of analyzing the positive electrode active material layer 21B by XPS was as described above.

(Fabrication of Negative Electrode)

First, 90 parts by mass of the negative electrode active material (graphite) and 10 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a paste negative electrode mixture slurry. Thereafter, the negative electrode mixture slurry was applied on each of the two opposed surfaces of the negative electrode current collector 22A (a band-shaped copper foil having a thickness of 15 μm) by means of a coating apparatus, following which the applied negative electrode mixture slurry was dried to thereby form the negative electrode active material layer 22B. Lastly, the negative electrode active material layer 22B was compression-molded by means of a roll pressing machine. Thus, the negative electrode 22 was fabricated.

(Preparation of Electrolytic Solution)

The electrolyte salt (lithium hexafluorophosphate ($LiPF_6$)) was added to the solvent (ethylene carbonate and ethyl methyl carbonate), following which the solvent was stirred. In this case, the mixture ratio (weight ratio) between ethylene carbonate and ethyl methyl carbonate in the solvent was set to 50:50, and the content of the electrolyte salt with respect to the solvent was set to 1 mol/kg.

Thereafter, the boron-containing compound, the sulfur-containing compound, and the fluorine-containing compound were added to the solvent to which the electrolyte salt had been added, following which the solvent was stirred. In this case, lithium tetrafluorophosphate ($LiBF_4$) was used as the boron-containing compound, 1,3-propanedisulfonic anhydride (PDSA) was used as the sulfur-containing compound, and lithium hexaflurophosphate ($LiPF_6$) was used in addition as the fluorine-containing compound. Further, the content of the boron-containing compound in the electrolytic solution was set to 1 wt %, the content of the sulfur-containing compound in the electrolytic solution was set to 1 wt %, and the content of the fluorine-containing compound in the electrolytic solution was set to 15 wt %. Thus, the electrolytic solution was prepared.

(Assembly of Secondary Battery)

First, the positive electrode lead 31 (a band-shaped aluminum foil) was welded to the positive electrode 21 (the positive electrode current collector 21A), and the negative electrode lead 32 (a band-shaped copper foil) was welded to the negative electrode 22 (the negative electrode current collector 22A).

Thereafter, the positive electrode 21 and the negative electrode 22 were stacked on each other with the separator 23 (a fine-porous polyethylene film having a thickness of 25 μm) interposed therebetween, following which the stack of the positive electrode 21, the negative electrode 22, and the separator 23 was wound to thereby fabricate the wound body. Thereafter, the wound body was pressed by means of a pressing machine to thereby shape the wound body into an elongated shape.

Thereafter, the outer package film 10 was folded in such a manner as to sandwich the wound body placed in the depression part 10U, following which the outer edges of two sides of the outer package film 10 (the fusion-bonding layer) were thermal-fusion-bonded to each other to thereby allow the wound body to be contained inside the pouch-shaped outer package film 10. As the outer package film 10, an aluminum laminated film was used in which the fusion-bonding layer (a polypropylene film having a thickness of 30 μm), the metal layer (an aluminum foil having a thickness of 40 μm), and the surface protective layer (a nylon film having a thickness of 25 μm) were stacked in this order from the inner side.

Lastly, the electrolytic solution was injected into the pouch-shaped outer package film 10, following which the outer edges of the remaining one side of the outer package film 10 (the fusion-bonding layer) were thermal-fusion-bonded to each other in a reduced-pressure environment. In this case, the sealing film 41 (a polypropylene film having a thickness of 5 μm) was interposed between the outer package film 10 and the positive electrode lead 31, and the sealing film 42 (a polypropylene film having a thickness of 5 μm) was interposed between the outer package film 10 and the negative electrode lead 32. The wound body was thereby impregnated with the electrolytic solution. In this manner, the battery device 20, i.e., the wound electrode body, was fabricated, and the battery device 20 was sealed in the pouch-shaped outer package film 10. Thus, the secondary battery was assembled.

(Stabilization of Secondary Battery)

The secondary battery was charged and discharged for one cycle in an ambient temperature environment (25° C. in temperature). Upon the charging, the secondary battery was charged with a constant current of 0.1 C until a voltage reached 4.2 V, and was thereafter charged with a constant voltage of that value of 4.2 V until a current reached 0.005 C. The condition of the ambient temperature environment (25° C. in temperature) described here applies also to the following. Upon the discharging, the secondary battery was discharged with a constant current of 0.1 C until the voltage reached 2.5 V. Note that 0.1 C is a value of a current that causes a battery capacity (a theoretical capacity) to be completely discharged in 10 hours, and 0.005 C is a value of a current that causes the battery capacity to be completely discharged in 200 hours.

As a result, the film 21C was formed on the surface of the positive electrode active material layer 21B, as described above. Thus, the positive electrode 21 was fabricated. Further, a film was formed on the surface of, for example, the negative electrode 22. The state of the secondary battery was thereby stabilized. Thus, the secondary battery of the laminated-film type was completed.

As a result of analyzing the physical property (the intensity ratios IBN, ISN, and IFN) of the positive electrode 21 (the film 21C) by XPS after the fabrication of the secondary battery, the intensity ratio IBN was 1.2, the intensity ratio ISN was 0.9, and the intensity ratio IFN was 9. The procedure of analyzing the positive electrode 21 (the film 21C) by XPS was as described above.

The secondary batteries were each evaluated for a battery characteristic (an initial capacity characteristic, a cyclability characteristic, a load characteristic, and a swelling characteristic). The results of the evaluation are presented in Table 2.

The secondary battery was charged and discharged for one cycle in the ambient temperature environment to measure the discharge capacity (an initial capacity). Charging and discharging conditions were similar to those in stabilizing the secondary battery described above. Values of the initial capacity listed in Table 2 are normalized values each obtained with respect to the value of the initial capacity of Example 1 assumed as 100.

First, the secondary battery was charged and discharged in a high-temperature environment (60° C. in temperature) to thereby measure the discharge capacity (a first-cycle discharge capacity). The condition of the high-temperature environment (60° C. in temperature) described here applies also to the following. Thereafter, the secondary battery was repeatedly charged and discharged in the same environment until the total number of cycles reached 100 to thereby measure the discharge capacity (a 100th-cycle discharge capacity). Charging and discharging conditions were similar to those in stabilizing the secondary battery described above. Lastly, the following was calculated: cycle retention rate (%)=(100th-cycle discharge capacity/first-cycle discharge capacity)×100.

First, the secondary battery was charged and discharged in the ambient temperature environment to thereby measure the discharge capacity (a first-cycle discharge capacity). Charging and discharging conditions were similar to those in stabilizing the secondary battery described above, except that the current at the time of charging and the current at the time of discharging were each changed from 0.1 C to 0.2 C. Thereafter, the secondary battery was charged and discharged again in the same environment to thereby measure the discharge capacity (a second-cycle discharge capacity). Charging and discharging conditions were similar to those in stabilizing the secondary battery described above, except that the current at the time of discharging was changed from 0.1 C to 10 C. Note that 0.2 C is a value of a current that causes the battery capacity to be completely discharged in 5 hours, and 10 C is a value of a current that causes the battery capacity to be completely discharged in 0.1 hours. Lastly, the following was calculated: load retention rate (%)= (second-cycle discharge capacity (current at time of discharging: 10 C)/first-cycle discharge capacity (current at time of discharging: 0.2 C))×100.

First, the secondary battery was charged in the ambient temperature environment and thereafter, a thickness (a pre-storage thickness) of the secondary battery was measured. Charging conditions were similar to those in stabilizing the secondary battery described above. Thereafter, the secondary battery in the charged state was stored in the high-temperature environment for a storage period of 24 hours, following which the thickness (a post-storage thickness) of the secondary battery was measured. Lastly, the following was calculated: swelling rate (%)=[(post-storage thickness−pre-storage thickness)/pre-storage thickness]×100.

As indicated in Table 2, the battery characteristic of the secondary battery varied depending on the analysis result on the positive electrode active material layer 21B obtained by XPS, that is, the physical property of the positive electrode active material layer 21B.

Specifically, in a case where not all of the physical property conditions 1 to 3 were satisfied (Comparative examples 9 to 15), there was a trade-off relationship in which improvement in any of the initial capacity, the cycle retention rate, the load retention rate, and the swelling rate resulted in deterioration of the other(s). Thus, it was difficult to improve each of the initial capacity, the cycle retention rate, the load retention rate, and the swelling rate.

In particular, in a case where the positive electrode active material (the lithium-nickel composite oxide) was manufactured by coprecipitation and firing including a single firing process (Comparative example 15), the relative ratio Z excessively increased, which resulted in the trade-off relationship described above.

In contrast, in a case where all of the physical property conditions 1 to 3 were satisfied (Examples 1 to 8), the trade-off relationship described above was overcome, and it was thus possible to improve each of the initial capacity, the cycle retention rate, the load retention rate, and the swelling rate.

In this case, if the positive electrode active material (the lithium-nickel composite oxide) included the additional element M (Mn) as a constituent element, in particular, the initial capacity increased while a high load retention rate was substantially maintained, as compared with a case where the lithium-nickel composite oxide did not include the additional element M (Mn) as a constituent element. Further, the swelling rate was sufficiently reduced even if the flexible outer package film 10 was used which causes deformation (swelling) to be visually recognized easily.

Examples 16 to 21 and Comparative Examples 22 to 27

As described in Table 3, secondary batteries were manufactured in accordance with a similar procedure except that the intensity ratios IBN, ISN, and IFN were each varied, following which the secondary batteries were each evaluated for a battery characteristic (the initial capacity characteristic, the cyclability characteristic, the load characteristic, and the swelling characteristic).

To vary each of the intensity ratios IBN, ISN, and IFN, the addition amount of each of the boron-containing compound, the sulfur-containing compound, and the fluorine-containing compound was changed in the process of preparing the electrolytic solution. The respective addition amounts (contents (wt %)) of the boron-containing compound, the sulfur-containing compound, and the fluorine-containing compound in the electrolytic solution were as listed in Table 3. In Table 3, for simplifying the wording, the boron-containing compound is denoted as "B-containing compound", the sulfur-containing compound is denoted as "S-containing compound", and the fluorine-containing compound is denoted as "F-containing compound".

TABLE 3

Lithium-nickel composite oxide = $LiNi_{0.820}Co_{0.140}Al_{0.040}O_2$ (NC ratio = 5.86); Concentration ratio X = 0.51; Concentration ratio Y = 0.27; Relative ratio Z = 1.90

| | | Electrolytic solution | | | | | Positive electrode (Film) |
|---|---|---|---|---|---|---|---|
| | B-containing compound | Content (wt %) | S-containing compound | Content (wt %) | F-containing compound | Content (wt %) | Intensity ratio IBN |
| Comparative example 22 | $LiBF_4$ | 0.3 | PDSA | 1 | $LiPF_6$ | 15 | 0.8 |
| Example 16 | | 0.5 | | | | | 0.9 |
| Example 1 | | 1 | | | | | 1.2 |
| Example 17 | | 1.5 | | | | | 1.8 |

TABLE 3-continued

Lithium-nickel composite oxide = $LiNi_{0.820}Co_{0.140}Al_{0.040}O_2$ (NC ratio = 5.86); Concentration ratio X = 0.51; Concentration ratio Y = 0.27; Relative ratio Z = 1.90

| | | | | | | | |
|---|---|---|---|---|---|---|---|
| Comparative example 23 | | 1.7 | | | | | 2.0 |
| Comparative example 24 | LiBF$_4$ | 1 | PDSA | 0.3 | LiPF$_6$ | 15 | 1.2 |
| Example 18 | | | | 0.5 | | | 1.2 |
| Example 19 | | | | 1.5 | | | 1.2 |
| Comparative example 25 | | | | 1.8 | | | 1.2 |
| Comparative example 26 | LiBF$_4$ | 1 | PDSA | 1 | LiPF$_6$ | 4 | 1.2 |
| Example 20 | | | | | | 6 | 1.2 |
| Example 21 | | | | | | 26 | 1.2 |
| Comparative example 27 | | | | | | 31 | 1.2 |

| | Positive electrode (Film) | | | | | |
|---|---|---|---|---|---|---|
| | Intensity ratio ISN | Intensity ratio IFN | Initial capacity (—) | Cycle retention rate (%) | Load retention rate (%) | Swelling rate (%) |
| Comparative example 22 | 0.9 | 9 | 100 | 88 | 76 | 80 |
| Example 16 | 0.9 | 9 | 100 | 89 | 77 | 17 |
| Example 1 | 0.9 | 9 | 100 | 90 | 78 | 9 |
| Example 17 | 0.9 | 9 | 100 | 89.5 | 76 | 14 |
| Comparative example 23 | 0.9 | 9 | 100 | 89 | 74 | 93 |
| Comparative example 24 | 0.3 | 9 | 100 | 88 | 76 | 60 |
| Example 18 | 0.4 | 9 | 100 | 89 | 77 | 12 |
| Example 19 | 1.2 | 9 | 100 | 89.5 | 76 | 15 |
| Comparative example 25 | 1.4 | 9 | 100 | 89 | 74 | 37 |
| Comparative example 26 | 0.9 | 7 | 100 | 88 | 76 | 90 |
| Example 20 | 0.9 | 8 | 100 | 89 | 77 | 19 |
| Example 21 | 0.9 | 13 | 100 | 89.5 | 76 | 16 |
| Comparative example 27 | 0.9 | 14 | 100 | 89 | 74 | 80 |

As indicated in Table 3, the battery characteristic of the secondary battery varied further depending on the analysis result on the positive electrode 21 (the film 21C) obtained by XPS, that is, the physical property of the positive electrode 21 (the film 21C).

Specifically, in a case where not all of the physical property conditions 4 to 6 were satisfied (Comparative examples 22 to 27), the trade-off relationship described above resulted, and it was thus difficult to improve each of the initial capacity, the cycle retention rate, the load retention rate, and the swelling rate.

In contrast, in a case where all of the physical property conditions 4 to 6 were satisfied (Examples 1 and 16 to 21), the trade-off relationship described above was overcome, and it was thus possible to improve each of the initial capacity, the cycle retention rate, the load retention rate, and the swelling rate.

Based upon the results presented in Tables 2 and 3, in the case where the positive electrode active material layer 21B included the lithium-nickel composite oxide of the layered rock-salt type as the positive electrode active material, where all of the physical property conditions 1 to 3 were satisfied regarding the analysis result (the concentration ratios X and Y and the relative ratio Z) on the positive electrode 21 or the positive electrode active material layer 21B obtained by XPS, and where all of the physical property conditions 4 to 6 were satisfied regarding the analysis result (the intensity ratios IBN, ISN, and IFN) on the positive electrode 21 obtained by XPS, the initial capacity characteristic, the cyclability characteristic, the load characteristic, and the swelling characteristic were each improved. Accordingly, the secondary battery achieved a superior battery characteristic.

Although the present technology has been described above with reference to one or more embodiments including Examples, configurations of the present technology are not limited to such description and are modifiable in a variety of suitable ways.

For example, although the description has been given of the case where the secondary battery has a battery structure of the laminated-film type, the battery structure is not particularly limited. Accordingly, the battery structure of the secondary battery may be of, for example, a cylindrical type, a prismatic type, a coin type, or a button type.

Further, although the description has been given of the case where the battery device has a device structure of the wound type, the device structure of the battery device is not particularly limited. Accordingly, the device structure of the battery device may be of, for example, a stacked type in which the electrodes (the positive electrode and the negative electrode) are stacked, or a zigzag folded type in which the electrodes (the positive electrode and the negative electrode) are folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

Further, the applications of the positive electrode described above are not limited to a secondary battery. The positive electrode may thus be applied to another electrochemical device such as a capacitor.

The effects described herein are mere examples, and effects of the present technology are therefore not limited to those described herein. Accordingly, the present technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode including a positive electrode active material layer;
a negative electrode; and
an electrolytic solution, wherein
the positive electrode active material layer includes a lithium-nickel composite oxide of a layered rock-salt type represented by Formula (1) below,
according to an analysis of the positive electrode active material layer performed at a surface of the positive electrode active material layer by X-ray photoelectron spectroscopy, a ratio X of an atomic concentration of Al to an atomic concentration of Ni satisfies a condition represented by Expression (2) below,
according to an analysis of the positive electrode active material layer performed at an inner part at a depth of 100 nanometers of the positive electrode active material layer by the X-ray photoelectron spectroscopy, a ratio Y of the atomic concentration of Al to the atomic concentration of Ni satisfies a condition represented by Expression (3) below,
a ratio Z of the ratio X to the ratio Y satisfies a condition represented by Expression (4) below,
a B1s spectrum, an S2p spectrum, an F1s spectrum, and an Ni3p spectrum are detectable by a surface analysis of the positive electrode by the X-ray photoelectron spectroscopy,
a ratio IBN of an intensity of the B1s spectrum to an intensity of the Ni3p spectrum satisfies a condition represented by Expression (5) below,
a ratio ISN of an intensity of the S2p spectrum to the intensity of the Ni3p spectrum satisfies a condition represented by Expression (6) below, and
a ratio IFN of an intensity of the F1s spectrum to the intensity of the Ni3p spectrum satisfies a condition represented by Expression (7) below, $$Li_aNi_{1-b-c-d}Co_bAl_cM_dO_e \qquad (1)$$

where
M is at least one of Fe, Mn, Cu, Zn, Cr, V, Ti, Mg, or Zr; and
a, b, c, d, and e satisfy $0.8<a<1.2$, $0.06 \le b \le 0.18$, $0.015 \le c \le 0.05$, $0 \le d \le 0.08$, $0<e<3$, $0.1 \le (b+c+d) \le 0.22$, and $4.33 \le (1-b-c-d)/b \le 15.0$, $$0.30 \le X \le 0.70 \qquad (2)$$

$$0.16 \le Y \le 0.37 \qquad (3)$$

$$1.30 \le Z \le 2.52 \qquad (4)$$

$$0.9 \le IBN \le 1.8 \qquad (5)$$

$$0.4 \le ISN \le 1.2 \qquad (6)$$

$$8 \le IFN \le 13 \qquad (7).$$

2. The secondary battery according to claim 1, wherein d in Formula (1) above satisfies $d>0$.

3. The secondary battery according to claim 1, further comprising an outer package member having flexibility and containing the positive electrode, the negative electrode, and the electrolytic solution.

4. The secondary battery according to claim 1, wherein
the positive electrode further includes a film covering the surface of the positive electrode active material layer,
the film includes boron, sulfur, and fluorine as constituent elements, and
the surface analysis of the positive electrode by the X-ray photoelectron spectroscopy comprises an analysis of the film.

5. The secondary battery according to claim 1, wherein the electrolytic solution includes a boron-containing compound, a sulfur-containing compound, and a fluorine-containing compound.

6. The secondary battery according to claim 5, wherein
the boron-containing compound includes a boron-containing lithium salt,
the sulfur-containing compound includes a cyclic disulfonic acid anhydride, an alkynyl sulfonic acid, or both, and
the fluorine-containing compound includes a fluorine-containing lithium salt.

7. The secondary battery according to claim 1, wherein the secondary battery comprises a lithium-ion secondary battery.

8. A positive electrode for a secondary battery, the positive electrode comprising
a positive electrode active material layer, wherein
the positive electrode active material layer includes a lithium-nickel composite oxide of a layered rock-salt type represented by Formula (1) below,
according to an analysis of the positive electrode active material layer performed at a surface of the positive electrode active material layer by X-ray photoelectron spectroscopy, a ratio X of an atomic concentration of Al to an atomic concentration of Ni satisfies a condition represented by Expression (2) below,
according to an analysis of the positive electrode active material layer performed at an inner part at a depth of 100 nanometers of the positive electrode active material layer by the X-ray photoelectron spectroscopy, a ratio Y of the atomic concentration of Al to the atomic concentration of Ni satisfies a condition represented by Expression (3) below,
a ratio Z of the ratio X to the ratio Y satisfies a condition represented by Expression (4) below, a B1s spectrum, an S2p spectrum, an F1s spectrum, and an Ni3p spectrum are detectable by a surface analysis of the positive electrode by the X-ray photoelectron spectroscopy, a ratio IBN of an intensity of the B1s spectrum to an intensity of the Ni3p spectrum satisfies a condition represented by Expression (5) below, a ratio ISN of an intensity of the S2p spectrum to the intensity of the Ni3p spectrum satisfies a condition represented by Expression (6) below, and a ratio IFN of an intensity of the F1s spectrum to the intensity of the Ni3p spectrum satisfies a condition represented by Expression (7) below, $$Li_aNi_{1-b-c-d}CO_bAl_cM_dO_e \quad (1)$$

where

M is at least one of Fe, Mn, Cu, Zn, Cr, V, Ti, Mg, or Zr; and $a$, $b$, $c$, $d$, and $e$ satisfy $0.8<a<1.2$, $0.06 \leq b \leq 0.18$, $0.015 \leq c \leq 0.05$, $0 \leq d \leq 0.08$, $0<e<3$, $0.1 \leq (b+c+d) \leq 0.22$, and $4.33 \leq (1-b-c-d)/b \leq 15.0$, $$0.30 \leq X \leq 0.70 \quad (2)$$

$$0.16 \leq Y \leq 0.37 \quad (3)$$

$$1.30 \leq Z \leq 2.52 \quad (4)$$

$$0.9 \leq IBN \leq 1.8 \quad (5)$$

$$0.4 \leq ISN \leq 1.2 \quad (6)$$

$$8 \leq IFN \leq 13 \quad (7).$$

* * * * *